US011981418B2

(12) United States Patent
Cottet et al.

(10) Patent No.: US 11,981,418 B2
(45) Date of Patent: May 14, 2024

(54) SYSTEM FOR CONTROLLING THE PITCH SETTING OF A PROPELLER VANE FOR AN AIRCRAFT TURBINE ENGINE

(71) Applicant: SAFRAN AIRCRAFT ENGINES, Paris (FR)

(72) Inventors: Clément Cottet, Moissy-Cramayel (FR); Vivien Mickaël Courtier, Moissy-Cramayel (FR); Vincent Joudon, Moissy-Cramayel (FR); Régis Eugène Henri Servant, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/006,285

(22) PCT Filed: Jul. 15, 2021

(86) PCT No.: PCT/FR2021/051315
§ 371 (c)(1),
(2) Date: Jan. 20, 2023

(87) PCT Pub. No.: WO2022/018358
PCT Pub. Date: Jan. 27, 2022

(65) Prior Publication Data
US 2023/0257105 A1    Aug. 17, 2023

(30) Foreign Application Priority Data

Jul. 24, 2020  (FR) ...................................... 2007809
Jul. 24, 2020  (FR) ...................................... 2007812
Jun. 2, 2021   (FR) ...................................... 2105788

(51) Int. Cl.
*B64C 11/06* (2006.01)
*F04D 29/32* (2006.01)

(52) U.S. Cl.
CPC ............ *B64C 11/06* (2013.01); *F04D 29/323* (2013.01)

(58) Field of Classification Search
CPC .......... B64C 11/06; F04D 29/323; F01D 7/00
See application file for complete search history.

(56) References Cited

U.S. PATENT DOCUMENTS 1,573,000 A    2/1926  Heath
2,648,391 A    8/1953  Cushman et al.
(Continued)

FOREIGN PATENT DOCUMENTS

CA    2778569 A1    12/2012
DE    42 03 205 A1   8/1993
(Continued)

OTHER PUBLICATIONS

International Search Report mailed Nov. 15, 2021, issued in corresponding International Application No. PCT/FR2021/051315, filed Jul. 15, 2021, 5 pages.
(Continued)

*Primary Examiner* — Eric J Zamora Alvarez
*Assistant Examiner* — Theodore C Ribadeneyra
(74) *Attorney, Agent, or Firm* — Christensen O'Connor Johnson Kindness PLLC

(57) ABSTRACT

A system for controlling the pitch setting of a propeller blade for an aircraft turbine engine is provided. The system generally including a blade having an airfoil connected to a root; a cup having an annular wall extending about a pitch axis of the blade and a lower axial end enclosed by a bottom wall; a locking ring that extends around the root and inside the cup; a safety element that ensures the retention of the root relative to the cup. The at least one safety element can
(Continued)

have a generally elongate shape and can pass through aligned holes in the bottom wall of the cup and in the free end of the root.

12 Claims, 20 Drawing Sheets

(56) References Cited

U.S. PATENT DOCUMENTS

| | | | |
|---|---|---|---|
| 2,704,129 | A | 3/1955 | Cushman |
| 3,061,341 | A | 10/1962 | Gryzch et al. |
| 4,762,466 | A * | 8/1988 | Bouiller ............... F01D 5/02 |
| | | | 416/205 |
| 5,118,256 | A | 6/1992 | Violette et al. |
| 8,801,383 | B2 * | 8/2014 | Soule ............... F16C 19/06 |
| | | | 416/204 R |
| 9,328,737 | B2 | 5/2016 | Bouru et al. |
| 2008/0279689 | A1 * | 11/2008 | Sebald ............... F16C 19/543 |
| | | | 416/174 |
| 2010/0239421 | A1 | 9/2010 | Boston et al. |
| 2013/0094943 | A1 * | 4/2013 | Bouru ............... B64C 11/06 |
| | | | 415/170.1 |
| 2015/0330233 | A1 | 11/2015 | Petellaz et al. |
| 2016/0290228 | A1 * | 10/2016 | van der Merwe ........ F01D 7/00 |
| 2017/0190433 | A1 | 7/2017 | Monton et al. |

FOREIGN PATENT DOCUMENTS

| | | |
|---|---|---|
| EP | 2674357 A2 | 12/2013 |
| FR | 2993920 A1 | 1/2014 |
| FR | 3 017 163 A1 | 8/2015 |
| FR | 3017163 A1 | 8/2015 |
| FR | 3 080 322 A1 | 10/2019 |
| WO | 2011009702 A1 | 1/2011 |
| WO | 2015121579 A1 | 8/2015 |

OTHER PUBLICATIONS

Written Opinion mailed Nov. 15, 2021, issued in corresponding International Application No. PCT/FR2021/051315, filed Jul. 15, 2021, 5 pages.

* cited by examiner

SYSTEM FOR CONTROLLING THE PITCH SETTING OF A PROPELLER VANE FOR AN AIRCRAFT TURBINE ENGINE

TECHNICAL FIELD OF THE INVENTION

The present invention relates to the field of aircraft turbine engines and in particular to the propulsion propellers of these turbine engines which comprise variable pitch vanes.

TECHNICAL BACKGROUND

The prior art comprises in particular the documents FR-A1-3 017 163 and FR-A1-3 080 322.

An aircraft turbine engine propeller can be ducted, as in the case of a fan for example, or un-ducted, as in the case of an open-rotor architecture for example.

A propeller comprises vanes which may be pitch variable. The turbine engine then comprises a mechanism allowing for changing the pitch angle of the vanes in order to adapt the thrust generated by the propeller to different phases of flight.

The design of a propeller vane involves several disciplines with generally conflicting objectives. It must allow optimal aerodynamic performance (i.e. provide a thrust while maximising the efficiency), guarantee a mechanical strength of the vane (i.e. withstand the mechanical constraints resulting from static and dynamic loadings) while limiting the mass and the acoustic signature. In particular, the improvement in the aerodynamic performance of the propeller tends towards an increase of the BPR (By Pass Ratio), which translates into an increase in its external diameter and therefore in the span of the vanes. However, the increase in the BPR goes hand in hand with a reduction in the FPF (Fan Pressure Ratio). Therefore, a pitch change system (variable pitch vane) is usually required to make the propeller operable throughout the flight domain.

There are several technologies for attaching a variable pitch propeller vane and several technologies for controlling the pitch setting of such a propeller vane. However, these technologies are relatively complex and expensive. Furthermore, in the event of a problem, and in particular breakage, they do not guarantee that the vanes are retained radially outwards in relation to the axis of rotation of the propeller, particularly when this propeller is not ducted.

In the event of failure of the retention means of a vane of the propeller, it is particularly important to ensure that this vane is retained to prevent it from being thrown outwards and impacting the fuselage of the aircraft equipped with the turbine engine. This safety function, referred to as "failsafe", is not always present in the control systems of the current technologies. The control systems that comprise this function typically comprise elements that are themselves susceptible to detachment and impact on the fuselage of the aircraft. The greater the size and density of these elements, the greater the risk of damage to the fuselage and the greater the need for special shielding, which impacts on the mass of the aircraft and therefore its performance.

There is therefore a need for a control system technology that integrates a simple and effective safety function.

SUMMARY OF THE INVENTION

The invention relates to a system for controlling the pitch setting of a propeller vane, for an aircraft turbine engine, characterised in that it comprises:
  a vane comprising a blade connected to a root,
  a cup comprising an annular wall extending around a pitch axis of the vane, this annular wall comprising a lower axial end closed by a bottom wall, and an upper axial end which is open and configured to allow the root of the vane to be mounted inside the cup, the bottom wall comprising a recess having a non-circular cross-section and configured to receive a free end of complementary shape of said root so that the cup is secured in rotation to the root about said axis, and
  an immobilisation ring extending around said axis and mounted around the root, this immobilisation ring being mounted within the cup and cooperating with the root and the annular wall of the cup respectively to ensure the axial retention of the root in the cup,
  and in that the system further comprises at least one safety element which ensures the retention of the root from the cup, said at least one safety element being generally elongate and extending transversely with respect to said axis, said at least one safety element passing through aligned orifices in the bottom wall of the cup as well as the free end of the root.

The safety function of the system is therefore ensured by at least one safety element which is located at the free lower end of the root of the vane. The safety element has an elongated shape in the transverse direction and has a limited overall dimension. It can be housed inside a casing of the propeller and is therefore not likely to be thrown out in the event of failure. This safety element passes through transverse orifices in the bottom wall of the cup and the free end of the root and is therefore relatively easy to fit, for example by dismounting a cover from the aforementioned casing or through an access hatch in this casing.

In the present application, a transverse direction is defined as a direction perpendicular to the pitch axis of the vane.

The system according to the invention may comprise one or more of the following characteristics, taken alone or in combination with each other:
  said at least one safety element is a bolt comprising a screw and a nut, the screw comprising a threaded rod which passes through said orifices and a head which is applied against a lateral face of the bottom wall, the nut being screwed onto the threaded rod and being supported on an opposite lateral face of the bottom wall;
  said at least one safety element is a stud comprising a cylindrical body passing through said orifices;
  said at least one safety element passes through the orifice of the free end of the root with a predetermined clearance;
  said at least one safety element passes through the orifices of the bottom wall of the cup with a predetermined clearance;
  said clearances are identical;
  the root of the vane comprises a body housed in an annular barrel which extends around said axis and which is housed at least partly inside said cup, said free end of the root being formed by a protuberance of said body and by an axial extension of said barrel which both comprise orifices for the passage of said at least one safety element;
  the clearances between said at least one safety element and the orifices of the barrel are smaller than the clearance between said at least one safety element and the orifice of the protuberance, and are preferably identical to the clearances between said at least one safety element and the orifices of the bottom wall of the cup;
  the system further comprises:

a lower rolling guide bearing extending around said axis and mounted around a lower portion of the annular wall;

an upper rolling guide bearing extending around said axis and mounted around an upper portion of the annular wall;

at least one of the guide bearings has its internal ring integrated into said cup;

at least one of the guide bearings is angular contact;

the recess is eccentric with respect to the pitch axis;

the system further comprises an elastically deformable member extending around the pitch axis and mounted within the cup, this member being supported axially on the bottom wall and being configured to axially bias the root of the vane outwardly of the cup;

the immobilisation ring is a dog clutch ring which comprises external dog teeth configured to cooperate with complementary internal dog teeth of the annular wall of the cup;

the system further comprises a locking annulus and an annular snap ring, the locking annulus being configured to be axially engaged between the internal and external dog teeth to prevent the rotation of the dog clutch ring within the cup, and the annular snap ring being mounted in the cup to axially lock the locking annulus in the cup;

the immobilisation ring is wedge-shaped in cross-section and is configured, under the effect of centrifugal forces in operation, to be biased axially outwards from the cup and to maintain the vane root axially clamped by wedge effect;

the barrel is produced by two half-shells fitted and attached to the body, the half-shells being joined at the level of a joint plane which passes through said pitch axis;

the barrel is glued to the body;

at least one shrink-fitting ring is mounted around the half-shells to maintain them tightened against the body, this shrink-fitting ring extending around the pitch axis;

a lower shrink-fitting ring is mounted on a low cylindrical surface of the barrel, and extends around at least one portion of the free end of the body;

an upper shrink-fitting ring is mounted on a high cylindrical surface of the barrel, and extends around a portion of a bulb of the body;

a dog clutch ring extends around the pitch axis and is captively mounted around a stilt of the root, between its bulb and the blade, this dog clutch ring comprising external dog teeth configured to cooperate with said system;

the dog clutch ring is configured to be mounted on the high cylindrical surface of the barrel;

the first guide bearing extends at least partly around the lower shrink-fitting ring, and the second guide bearing extends at least partly around the upper shrink-fitting ring.

The guide bearings take up the mechanical actions resulting from the aerodynamic and centrifugal forces applied to the vane during operation. The lower bearing can be configured to ensure the centrifugal retention of the vane and the upper bearing can be configured to take up the bending moment resulting from aerodynamic and centrifugal forces. The distance between the bearings along the pitch axis generates a sufficient leverage to prevent the vane from swivelling in any phase of flight.

The present invention also relates to an assembly comprising a system as described above and a variable pitch propeller vane, this vane comprising a blade connected to a root, the root comprising a body housed in an annular barrel which extends around a pitch axis of the vane.

Said body is preferably solid (i.e. without a recessed hollowed portion). Advantageously, said body comprises a free end located on the opposite side of the blade, this free end being configured to cooperate in a form-fitting manner with the control system. The barrel is preferably independent of the control system.

The present invention also relates to a turbine engine, in particular for an aircraft, comprising at least one system as described above.

The present invention finally relates to a method for mounting a system as described above, wherein it comprises the steps of:

a) inserting the root of the vane within the cup of the system by displacing the vane in a direction parallel to the pitch axis, b) engaging the free end of the root in a recess in the bottom wall of the cup so as to secure in rotation the cup to the root of the vane, and c) engaging the immobilisation ring, previously mounted or present around the root of the vane, in the cup and mounting this ring in the cup and on the root of the vane so as to ensure the axial retention of the root in the cup and d) engaging said at least one safety element in the orifices of the bottom wall of the cup and the free end of the root.

Advantageously, during the steps a) and/or b), the root of the vane is supported on the elastically deformable member and compresses it axially.

Preferably, during the step c), the immobilisation ring is mounted into the cup by dog clutch.

BRIEF DESCRIPTION OF THE FIGURES

Further characteristics and advantages will be apparent from the following description of a non-limiting embodiment of the invention with reference to the appended drawings in which.

DETAILED DESCRIPTION OF THE INVENTION

Figure 1:
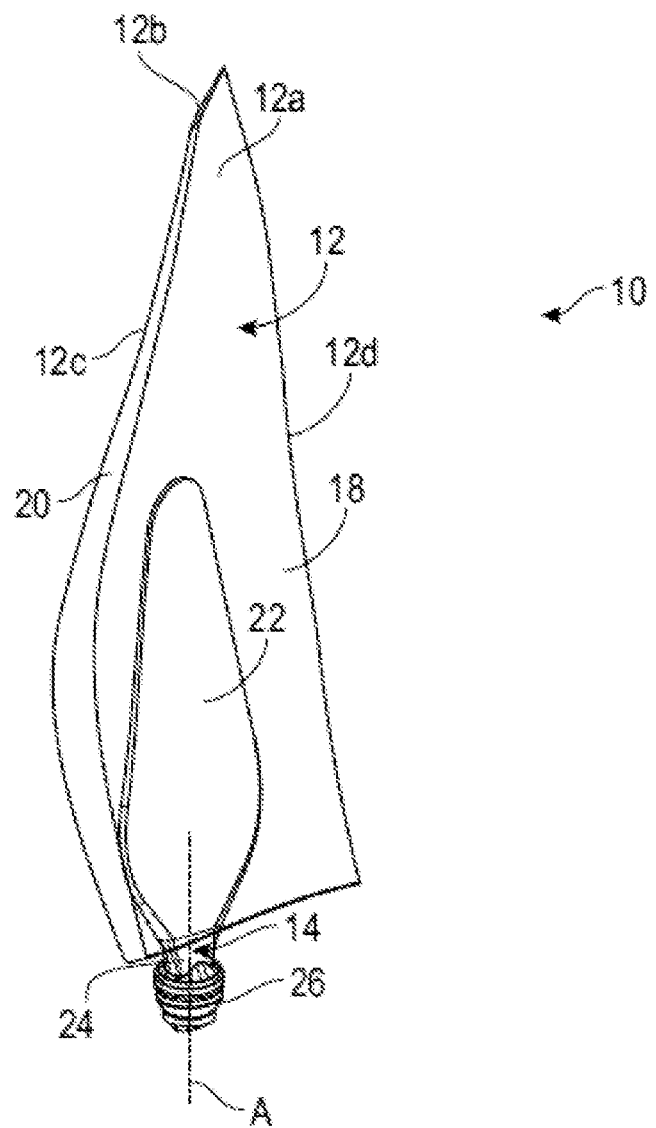
FIG. 1 is a schematic perspective view of a propeller vane for an aircraft turbine engine.
Figure 2:
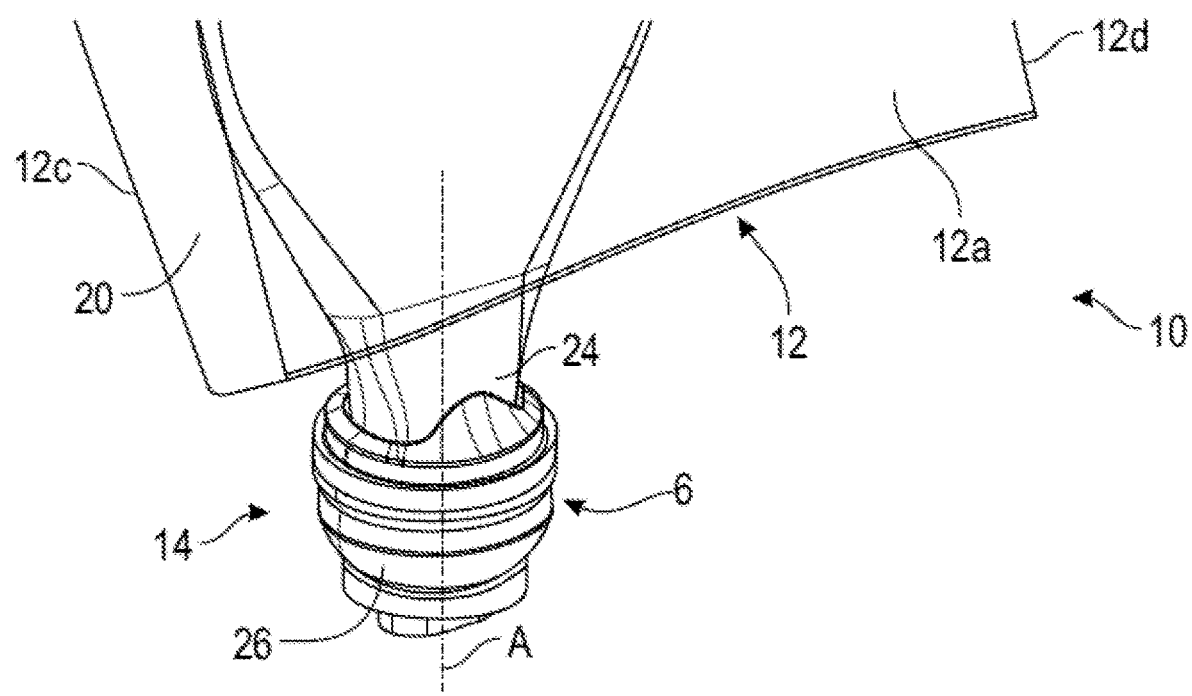
FIG. 2 is a larger scale view of a portion of FIG. 1 and shows the root of the vane.

FIG. 1 shows a vane 10 for a propeller of an aircraft turbine engine, this propeller being either ducted or unducted.

The vane 10 comprises a blade 12 connected to a root 14.

The blade 12 has an aerodynamic profile and comprises an intrados 12a and an extrados 12b which are connected by an upstream leading edge 12c and a downstream trailing edge 12d, the terms upstream and downstream referring to the flow of the gases around the blade in operation.

The blade 12 has an upper end which is free, referred to as summit, and a lower end which is connected to the root 14.

In the example shown, the vane 10 is made of a composite material by an injection method referred to as RTM method (Resin Transfer Molding). This method consists of preparing a fibrous preform 18 by three-dimensional weaving, then placing this preform in a mould and injecting a polymerizable resin, such as an epoxy resin, which will impregnate the preform. After the blade 12 has cured and hardened, its leading edge 12c is usually reinforced by a metal sheath 20 which is fitted and attached, for example by gluing.

The vane 10 here comprises a spar 22 which comprises a portion forming a core of the blade 12 and which is intended to be inserted into the preform 18 prior to the resin injection, and a portion which extends from the side opposite the summit of the blade 14 to form a portion of the root 14, referred to as body 24.

The spar 22 is preferably made of a 3D woven carbon fibre reinforced epoxy organic matrix composite material with the warp direction predominantly radial oriented and the weft predominantly oriented along the chord of the blade at aerodynamic duct height. However, the spar can also be a more mechanically advantageous assembly of different organic matrix composite materials (thermoset, thermoplastic or elastomer) reinforced with long fibres (carbon, glass, aramid, polypropylene) in different fibrous arrangements (woven, braided, knitted, unidirectional).

Although not shown, the blade 12 may be hollow or solid and comprises an internal cavity filled with a foam or honeycomb type filler material. This filler material is installed around the spar 22 and is covered with a skin of organic matrix composite material to increase the impact resistance of the blade.

The sheath 20 may be titanium or titanium alloy, stainless steel, steel, aluminium, nickel, etc. The intrados 12a or even the extrados 12b of the blade 12 may be covered with a polyurethane film for the protection against erosion.

The root 14 comprises essentially two portions, namely this body 24 and an annular barrel 26 which extends around the body 24 and an axis A of the vane.

The axis A is an axis of elongation of the vane 10 and of the blade 12 and in particular a pitch axis of the vane, i.e. the axis about which the angular position of the vane is adjusted. It is usually also a radial axis and therefore extends along a radius from the axis of rotation of the propeller equipped with this vane.

The body 24 of the root 14 has a particular shape best seen in FIGS. 3 to 7.

The body 24 essentially comprises three portions:
a free end 28 located on the opposite side to the blade 12,
a stilt 30 located on the side of the blade, and
a bulb 32 located between the free end and the stilt.

Figure 7:
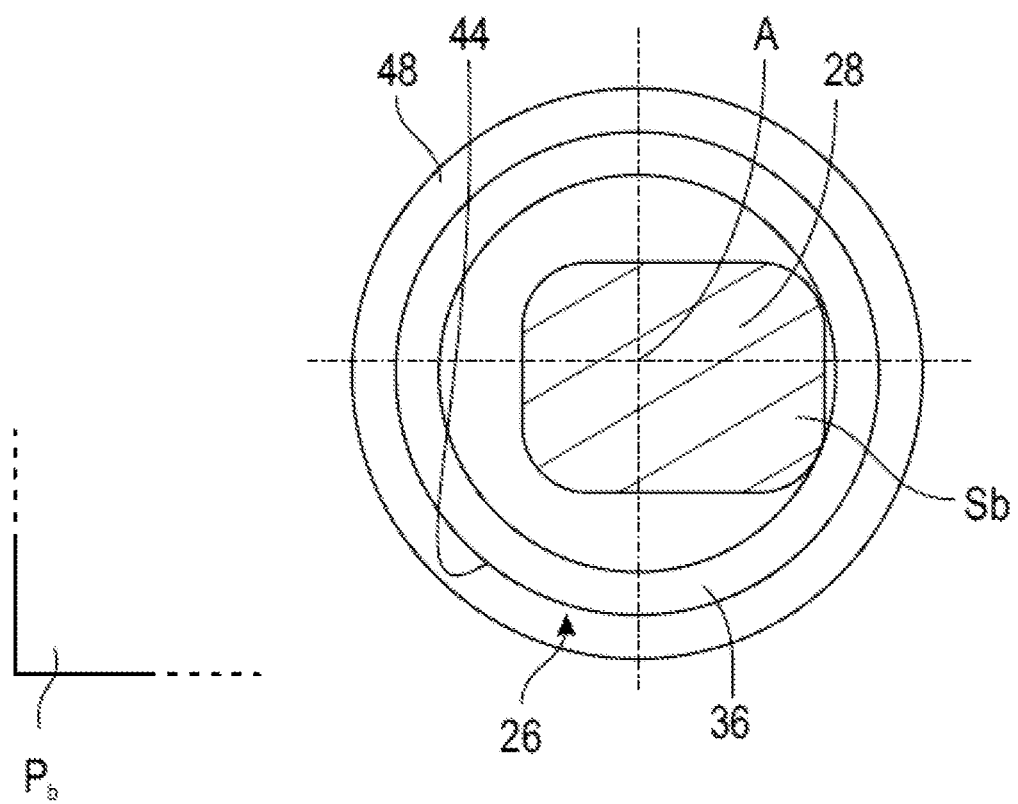
FIG. 7 is another schematic cross-sectional view along the line VII-VII of FIG. 5.

The free end 28 has a generally parallelepiped shape in the example shown. As can be seen in FIG. 7, this end 28 is offset from the axis A to achieve a keying or an indexing, as will be explained in more detail below.

Pb is defined as a transverse plane, i.e. a plane perpendicular to the axis A, passing substantially through the middle of the end 28, measured along the axis A. This plane Pb is referred to as low or lower plane. FIG. 7 shows the section shape of the end 28 in this plane Pb. This section, referred to as low section, has a value or a surface area, for example maximum, denoted Sb and is generally rectangular in shape in the example shown.

As will also be described below, the end 28 is configured to cooperate with a system 34 for controlling the pitch setting of the vane.

Figure 4:
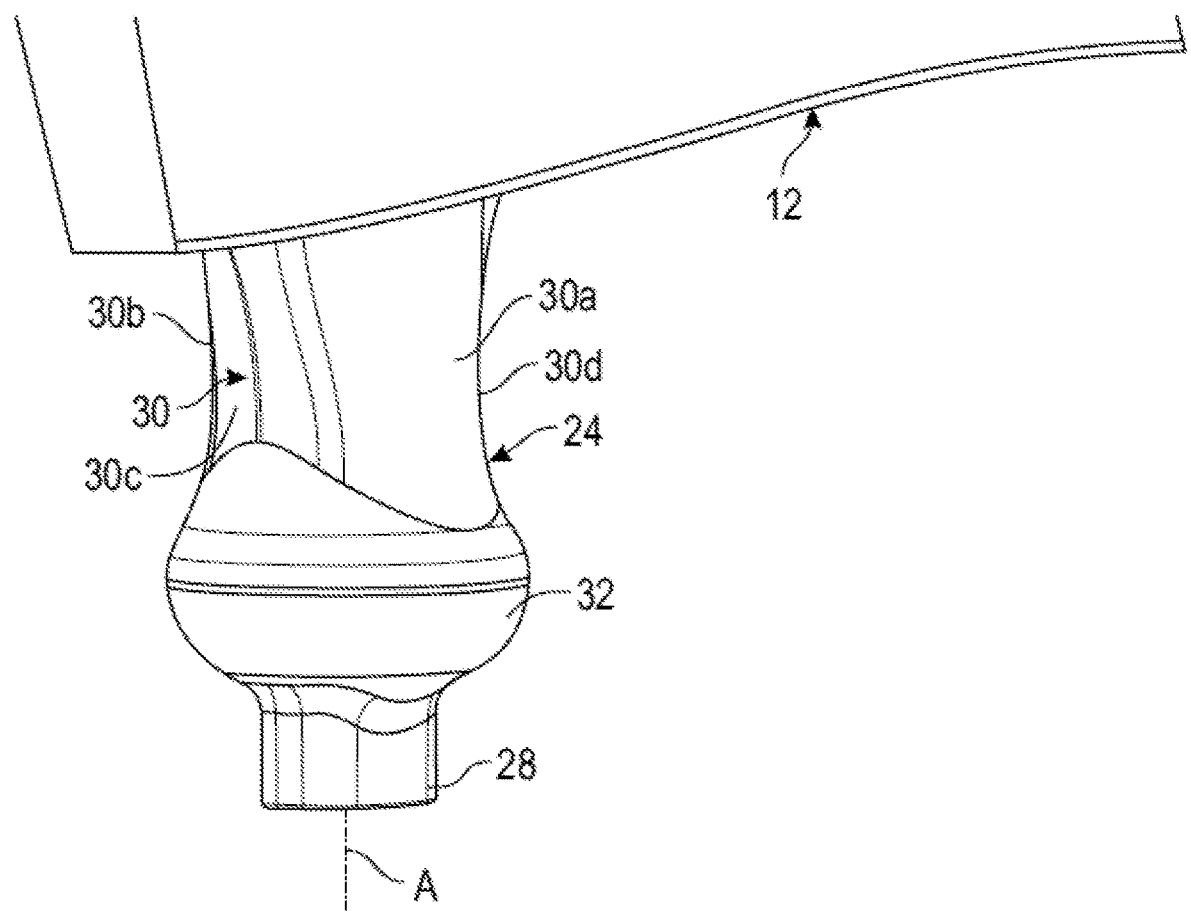
FIG. 4 is a schematic perspective view of the body of the root of the vane in FIG. 1.
Figure 5:
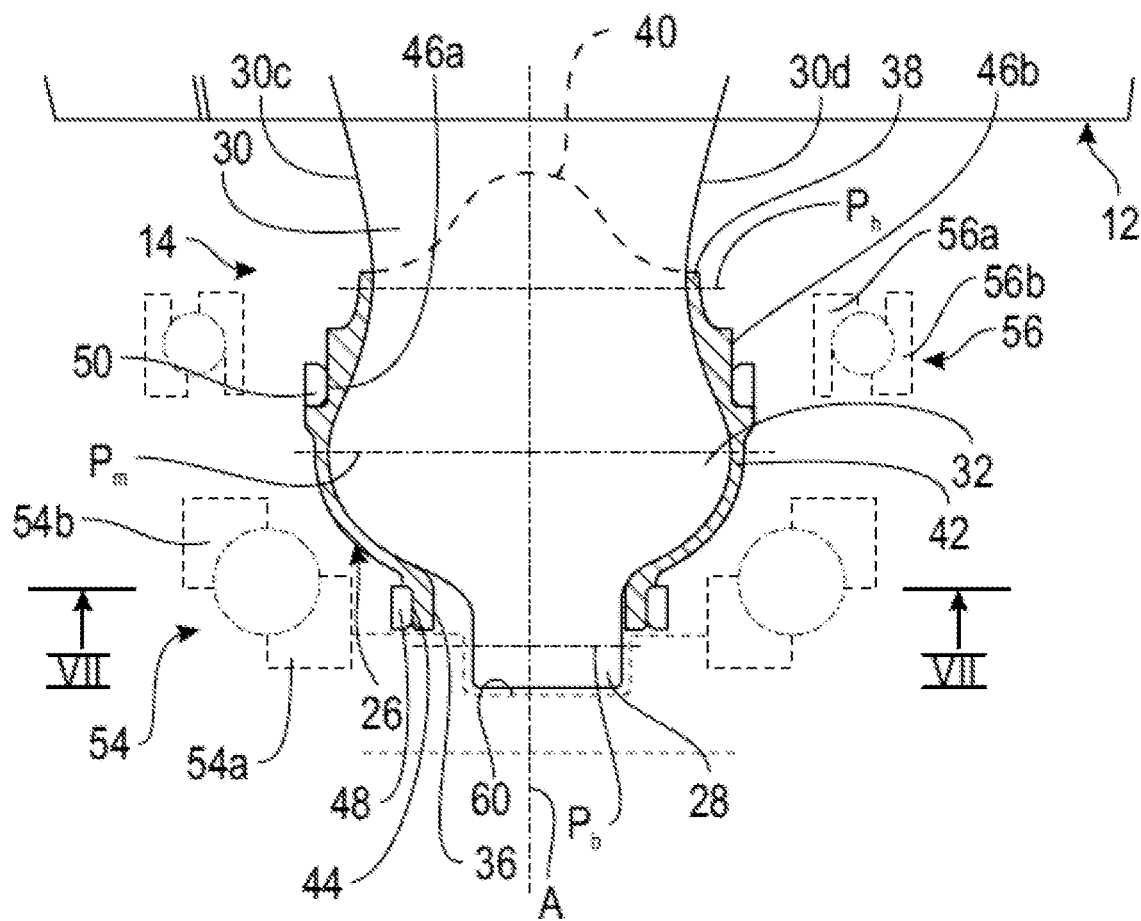
FIG. 5 is a further schematic axial sectional view of the root of the vane of FIG. 1 and guide bearings, the sectional plane extending along a chord of the blade of the vane.

The stilt 30 has a relatively complex shape and can be considered as comprising:
two lateral flanks 30a, 30b, located respectively on the side of the intrados 12a and the extrados 12b of the blade 12, which converge towards each other along the axis A and in the direction of the summit of the blade 12 (cf. FIGS. 4 and 6), and
two edges, respectively upstream 30c and downstream 30d, which on the contrary diverge from each other along the axis A and in the direction of the summit of the blade 12 (cf. FIGS. 4 and 5).

Ph is defined as a transverse plane passing through the stilt 30, and in particular its lower end. This plane Ph is referred to as high or upper plane. In this plane, the stilt may have a non-circular shape in section, for example oval, oblong, square or rectangular. This section, referred to as high section, has a value or a surface area, for example maximum, noted Sh.

The bulb 32 has a generally bulged or domed shape, this bulging or doming extending around the axis A.

Pm is defined as a median plane passing through the bulb 32, and in particular in its largest cross-section portion, which is denoted Sm. This plane Pm is referred to as mean plane. In this plane, the bulb 32 may have a circular shape in section, although this section is not limiting.

It is understood that the plane Pm is located between the planes Pb and Ph. The cross-section of the bulb 32 decreases from the plane Pm (Sm) to the plane Ph, and from the plane Pm towards the plane Pb. It is therefore understood that Sm is greater to Sb and Sh. Furthermore, in the example shown, Sh is greater than Sb.

Figure 3:
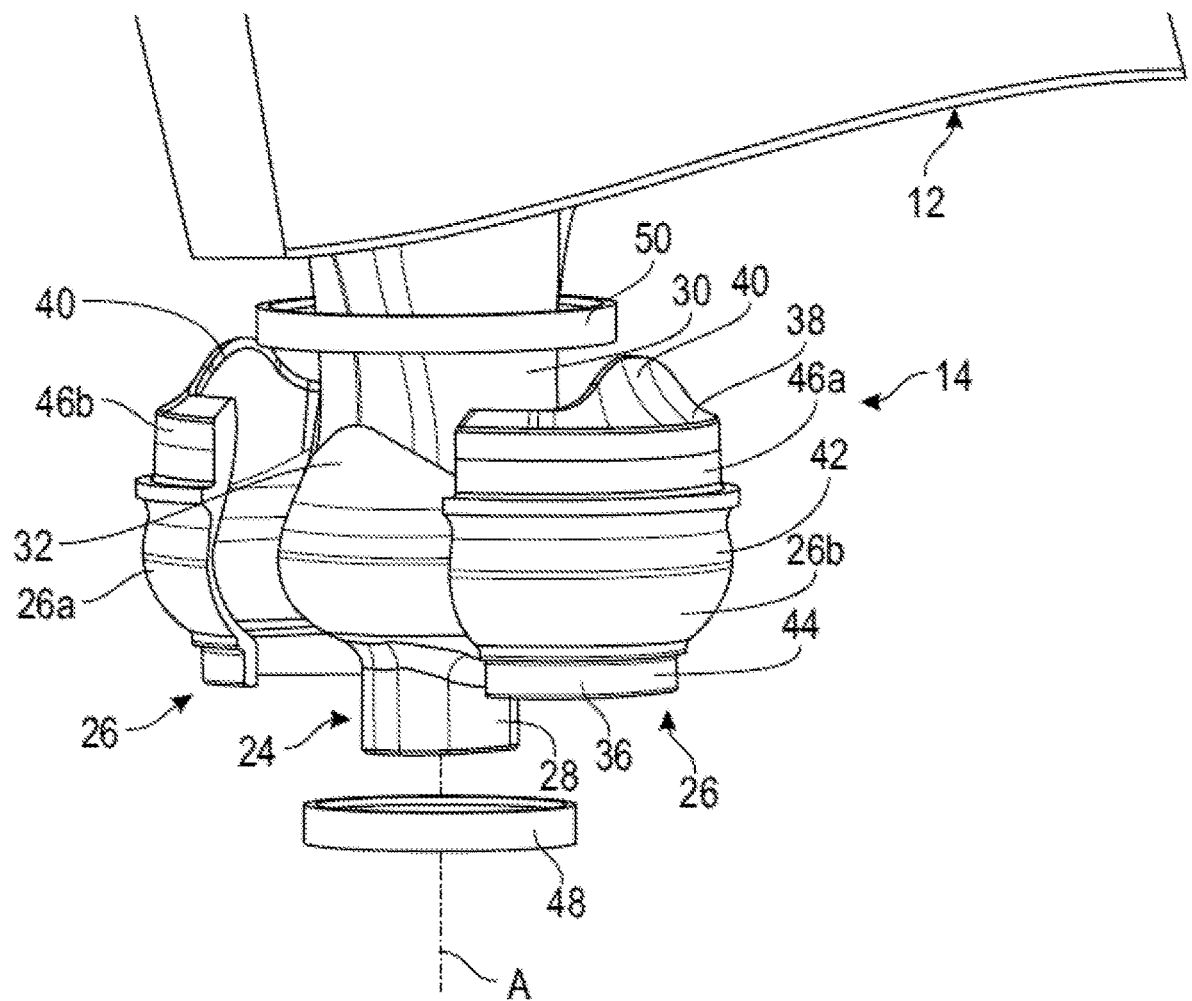
FIG. 3 is a schematic perspective view with partial exploded view of the root of the vane of FIG. 1.

The barrel 26 is produced in two half-shells 26a, 26b, as can be seen in FIG. 3, which are fitted and attached to the body 24, for example one on the side of the intrados 12a of the blade and the other on the side of the extrados 12b of the blade 12. The half-shells 26a, 26b are thus joined at the level of a joint plane which passes through the axis A and extends substantially parallel to a chord of the blade 12.

The barrel 26 is advantageously attached to the body 24, preferably by gluing. The glue extends between the barrel and the body, all around the axis A.

The barrel 26 is preferably metallic (steel, titanium or titanium alloy such as TA6V). The glue is, for example, an epoxy glue filled with thermoplastic or elastomeric nodules or reinforced with a fabric. This gluing method is particularly suitable because of the large contact surface area between the cavity of the barrel and the body, which can be composite. The presence of a glue joint is advantageous because it allows slight form defects to be corrected. The glue joint also allows to prevent the friction at the metal/composite interface and thus increases the service life of the vane.

Several possibilities are envisaged for fitting the barrel 26 to the body 24. A first possibility is to deliberately leave a clearance between the two half-shells 26a, 26b of the barrel 26 once they have been fitted, so that the pressure can be properly applied when the glue joint cures. The curing phase can be done in an autoclave with the entire vane inside a vacuum bag. However, it is also possible to carry out this operation in a press. However, the disadvantage of leaving a clearance between the two half-shells 26a, 26b is that their positioning is less controllable and therefore a rework of the external surface must be carried out. A second possibility is to fit the half-shells one against the other around the body without any existing clearance. This strategy is possible, for example, by machining a blank that has already been cut into two portions and maintained together during the machining operation in order to ensure the geometry of the external surfaces once the half-shells are reassembled. This allows the positioning and the geometry of the external surface of the barrel 26 to be controlled without the need for additional machining after gluing. In any case, positioning pins or stops can be considered to ensure the relative position of the half-shells of the barrel.

The presence of a glue joint between the body and the barrel is, however, not mandatory, although it is very advantageous. Alternatively, pre-stressing washers (or springs) can be used between the barrel and the composite body in order to push the body radially against the bearing surfaces of the barrel. The geometry of the barrel can also be used to slightly "clamp" the body when the two half-shells of the barrel are fitted around the bulb. In this case, it is the deformation of the barrel that generates a pre-stress. A tooling must therefore be provided to maintain this position before final assembly.

Figure 6:
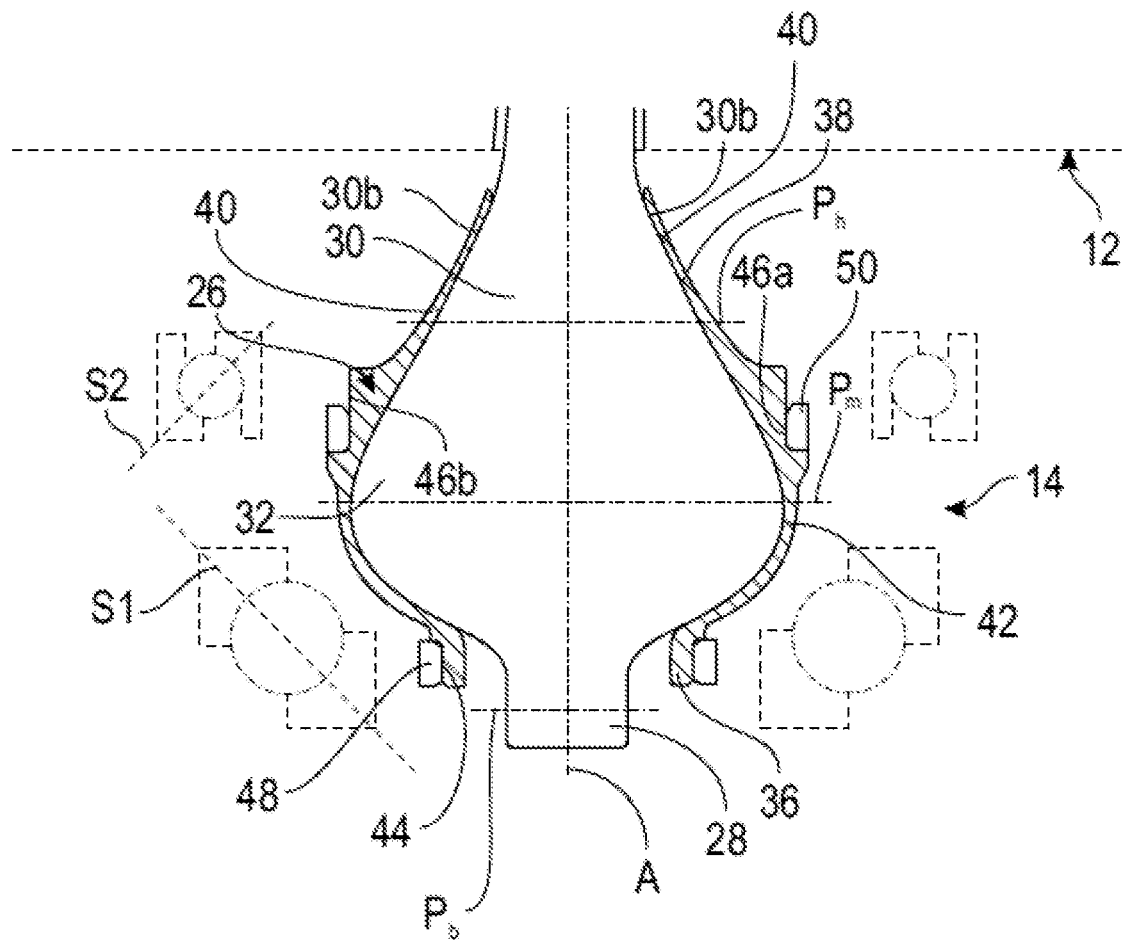
FIG. 6 is a schematic axial sectional view of the root of the vane of FIG. 1 and the guide bearings, with the sectional plane extending transversely to the chord of the blade of the vane.

As can be seen in FIGS. 5 and 6, the barrel 26 covers and conforms to at least one portion of the bulb 32 and of the stilt 30, and has a complementary shape in section to the bulb 32 at the level of the middle section Sm, and to the stilt 30 at the level of the high section Sh.

More specifically, the barrel 26 comprises three portions in the example shown,
 a lower end 36 which is generally annular in shape (see FIGS. 5-7) and extends at the level of and around the free end 28 of the root,
 an upper end 38 which extends at the level of the plane Ph and which comprises two lateral lips 40 applied to the flanks 30a, 30b of the stilt 30, and
 a median portion 42 applied to the bulb 32 and closely conforming its shape.

The lips 40 are supported on the flanks 30a, 30b of the stilt 30 and allow to stiffen the root 14 of the vane and to reinforce its resistance to torsion about the pitch axis A.

In addition, they allow energy to be absorbed in the event of an impact on the vane 10, such as the ingestion of a bird. Fillets may be present on these lips to prevent the local wear or damage to the body.

The internal surfaces of the barrel 26 that are in contact with the body 24 serve as bearing surfaces. Compared to a broached attachment, the bearing surface is maximised by exploiting the entire circumference of the bottom of the vane. In a broached attachment, only two distinct surfaces of the root of the vane, respectively located on the intrados and the extrados, are supported on bearing surfaces, while the surfaces of the vane root located on the leading edge and on the trailing edge are free. Also in comparison to a broached attachment, the height of the bearing surfaces in the radial direction is much greater, which also contributes to a considerable increase in their surface area. This large support surface allow to reduce the contact pressure in all operating conditions.

The barrel 26 comprises two cylindrical surfaces 44, 46a for mounting shrink-fitting rings 48, 50. The shrink-fitting rings 48, 50 allow to maintain the half-shells 26a, 26b tightened one against the other and to the body 24. The shrink-fitting rings 48, 50 extend around the axis A.

The surface 44 is located on the lower end 36 and is oriented radially outwards with respect to the axis A. It receives the ring 48 by shrink-fitting, which is engaged from below and is supported axially on a cylindrical bearing surface located at the junction of the end 36 and the median portion 42 of the barrel 26.

The surface 46a is located on the median portion 42 and is oriented radially outwards with respect to the axis A. It receives the ring 50 by shrink-fitting, which is engaged from above and is supported axially on a cylindrical bearing surface located near the plane Pm.

It can be seen that the surface 46a is located immediately adjacent to a cylindrical surface 46b which is intended to receive an immobilisation ring 52, as will be described in the following.

The surfaces 44, 46a and the rings 48, 50 have different diameters in the example shown. The surface 46a has a larger diameter than that of the surface 44 and therefore the ring 50 has a larger diameter than that of the ring 48.

The surfaces 46a, 46b may have the same or different diameters. The surface 46b may for example have a slightly smaller diameter than that of the surface 46a. This is in particular the case where the ring 50 should be mounted with a predetermined radial clearance with respect to this surface 46b.

It can be seen from FIGS. 5 and 6 that the ring 50 is located between the planes Ph and Pm, and the ring 48 is located between the planes Pm and Ps.

FIGS. 5 and 6 also show the position of the rings 48, 50 and the planes Pm, Ph, Ps in relation to rolling bearings 54, 56 which extend around the axis A and the root 14.

The bearings 54, 56 are here two in number and are a lower bearing 54 and an upper bearing respectively.

The bearings 54, 56 are of the ball rolling type. In the example shown, they have different diameters and their balls also have different diameters.

The bearing 54 extends substantially between the planes Pm and Pb and thus around a lower portion of the bulb 32. It also extends around the ring 48. This bearing 54 has a smaller diameter than the other bearing 56, and theirs balls have a larger diameter than those of the other bearing 56.

The bearing 54 is also angular contact. In the example shown, the support points or surfaces of the balls on the raceways of their rings 54*a*, 54*b* are located on a frustoconical surface S1 which extends along the axis A and whose largest diameter is located on the side of the summit of the vane.

The bearing 56 extends substantially between the planes Pm and Ph and thus around an upper portion of the bulb 32. It also extends around the ring 50. The bearing 56 is also angular contact. In the example shown, the support points or surfaces of the balls on the raceways of their rings 56*a*, 56*b* are located on a frustoconical surface S2 which extends along the axis A and whose largest diameter is located on the side of the free end of the root of the vane.

The position of the middle section between the two bearings 54, 56 is very advantageous in terms of radial overall dimension because a portion of the bearing surface height between the middle section and the high section is located inside the cup 58, unlike the prior art on the broached attachment integrated in a pivot. This helps to reduce the radial overall dimension of the control system 34.

FIGS. 8 to 17 illustrate an example of an embodiment of the system and in particular of the immobilisation ring 52.

The system 34 comprises a cup 58 comprising an annular wall 58*a* extending about the axis A. This wall 58*a* comprises a lower axial end closed by a bottom wall 58*b*, and an upper axial end which is open and configured to permit the mounting of the root 14 of the vane within the cup. It is considered here that the axis A of the cup is that of the vane, corresponding to the axis of rotation for the pitch setting change of the vane, substantially radially with respect to the rotation of the propeller.

The bottom wall 58*b* is configured to cooperate in a form-fitting manner with the free end of the root 14, and thus with the end 28 of the body 24, so that the cup is secured in rotation to the root about the axis.

Figure 8:
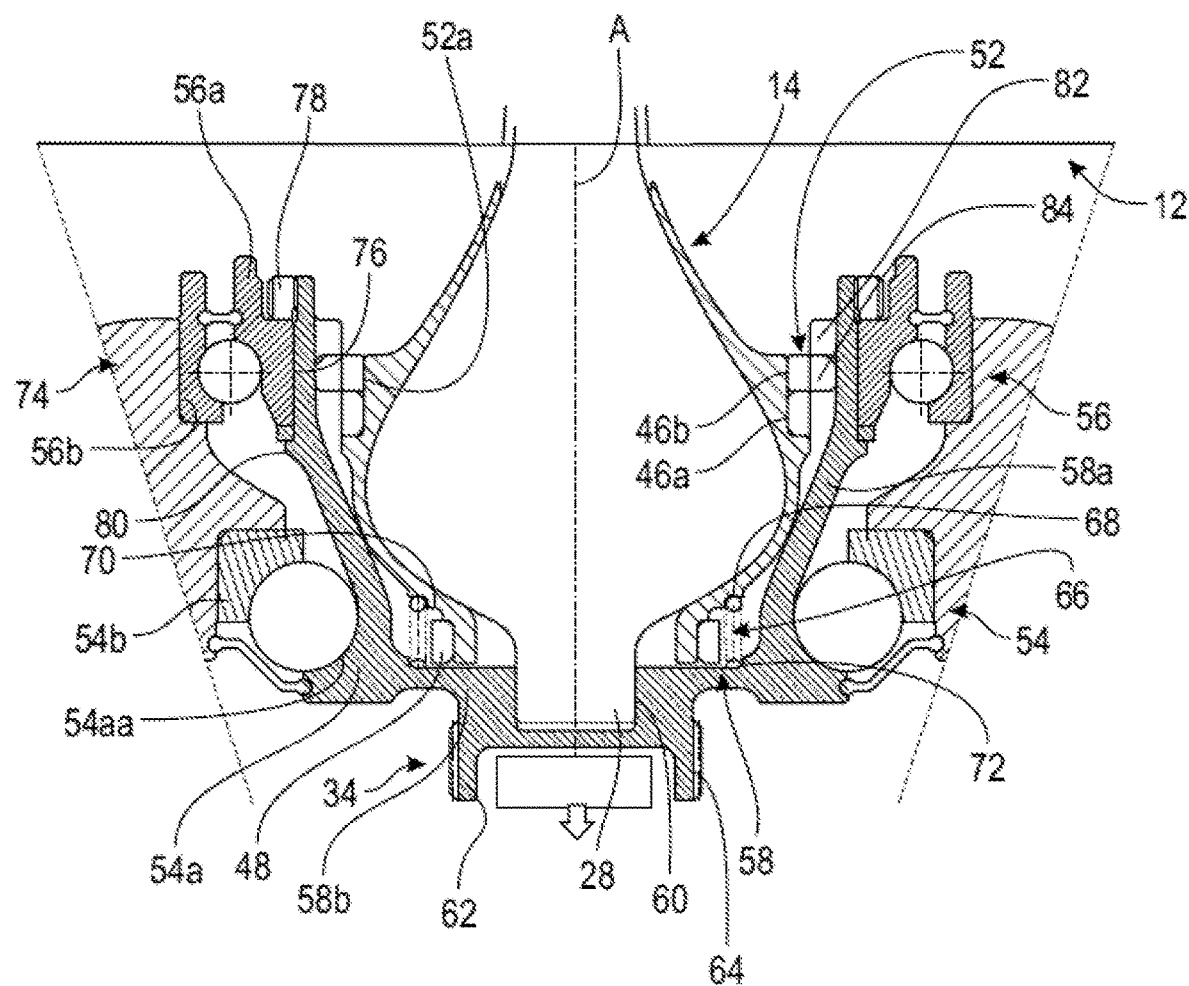
FIG. 8 is a schematic axial sectional view of the vane root of FIG. 1 and a system for controlling the pitch setting of this vane.

In the present case, it is understood that the bottom wall 58*b* comprises a recess 60 having a non-circular, and in particular rectangular, cross-section and configured to receive the end 28 (FIG. 8). As can be seen in FIG. 5, this recess 60 is eccentric with respect to the axis A in a similar way to the end 28 (see FIG. 7). This eccentricity allows an indexing and a keying when inserting and mounting the root into the cup 58, with only one engagement position of the end 28 in the recess 60 being possible.

The recess 60 is located on an upper or internal face of the bottom wall 58*b* of the cup 58, which is thus located inside the cup and oriented towards the root.

The system 34 generates a torque at the vane root that counteracts the torsional moment resulting from aerodynamic and centrifugal forces. The end 28 of the root 14 could be enveloped in the barrel 26, like the rest of the body 24 of the root 14. In this case, it would also have a non-circular shape to constrain its rotation. However, it is advantageous to let this end of the body protrude from the barrel, as mentioned above, in order to directly constrain the rotation of the body. This provides a more direct force path, with the torsional moment applied directly to the body. The low section has dimensions strictly smaller than the maximum dimension of the middle section in order to limit the circumferential overall dimension to this height. As a result, the barrel also has a smaller circumferential overall dimension at this height than at the level of the middle section. This allows to reduce the diameter of the lower bearing which is located below the middle section. Thus, the vane root can be integrated lower radially, which greatly reduces the theoretical hub ratio associated with the integration of the root. It is known to the person skilled in the art that a low hub ratio improves the performance of the engine, in particular as it is more compact and therefore lighter. This last point is a very important advantage of the technical solution compared to the competition, which traditionally proposes barrels with cylindrical external shape.

The bottom wall 58*b* comprises a lower or external face, which is located on the opposite side of the root 14, and which comprises a cylindrical extension 62 extending along the axis A and comprising an external threads or external straight splines 64 for the rotational coupling of the system with a pitch change mechanism which is not illustrated and which is common to the different systems 34 and vanes 10 of the propeller.

An elastically deformable member 66, such as a helical spring, extends around the axis A and is mounted within the cup 58. This member 66 is supported axially on the upper surface of the bottom wall 58*b*, at the external periphery of this surface in the example shown, and is configured to axially bias the root of the vane towards the outside of the cup i.e. towards the side of the summit of the vane.

The member 66 is supported on a cylindrical bearing surface 68 of the barrel 26. In the example shown, the member 66 is centred by engaging its upper end on and around a cylindrical rim 70 of the barrel, and by engaging its lower end on and around a cylindrical rim 72 of the cup located at the external periphery of the bottom wall 58*b*.

The member 66 here extends around the shrink-fitting ring 48.

As can be seen in FIG. 8, the cup 58 is designed to support the bearings 54, 56 which ensure the centring and the guiding of the cup about the axis A with respect to a casing 74 or a stationary structure of the turbine engine. The cup 58 thus acts as a pivot for the vane, relative to the casing 74.

The bearings 54, 56 may be part of the control system. In particular, at least one of the guide bearings may have its internal ring integrated into the cup.

This is the case for the lower bearing 54 which has its internal ring 54*a* integrated into the cup 58. In practice, this means that the cup comprises a raceway 54*aa* at its external periphery on which the balls of the bearing 54 roll directly. This raceway comprises an annular surface with a concave curved section. This raceway is located at the lower end of the cup and of the wall 58*a*. The external ring 54*b* of the bearing 54 is attached to the casing 74, for example by shrink-fitting. Furthermore, the cup 58 is advantageously designed to apply a pre-stress to the bearing 54.

The external ring 56*b* of the bearing 56 is attached to the casing 74, for example by shrink-fitting. Its internal ring 56*a* is engaged on and around the free upper end of the cup 58 and of the wall 58*a*. This end of the wall 58*a* comprises an external cylindrical surface 76 for mounting the internal ring 56*a* as well as an external thread for screwing on a nut 78 intended to be supported axially on the internal ring 56*a* to maintain it tightened axially against an external cylindrical shoulder 80 of the cup 58.

The wall 58a of the cup further comprises at its internal periphery means configured to cooperate with the aforementioned immobilisation ring 52.

The immobilisation ring 52 extends around the axis A and is configured to be mounted around the root 14. This immobilisation ring 52 is configured to be mounted within the cup and to cooperate respectively with the root 14 and the annular wall 58a of the cup 58 in order to ensure the axial retention of the root in the cup.

In the example embodiment of FIGS. 8 to 17, this immobilisation ring 52 is a dog clutch ring which comprises external dog teeth 84 configured to cooperate with complementary internal dog teeth 82 of the annular wall 58a of the cup 58.

Figure 9:
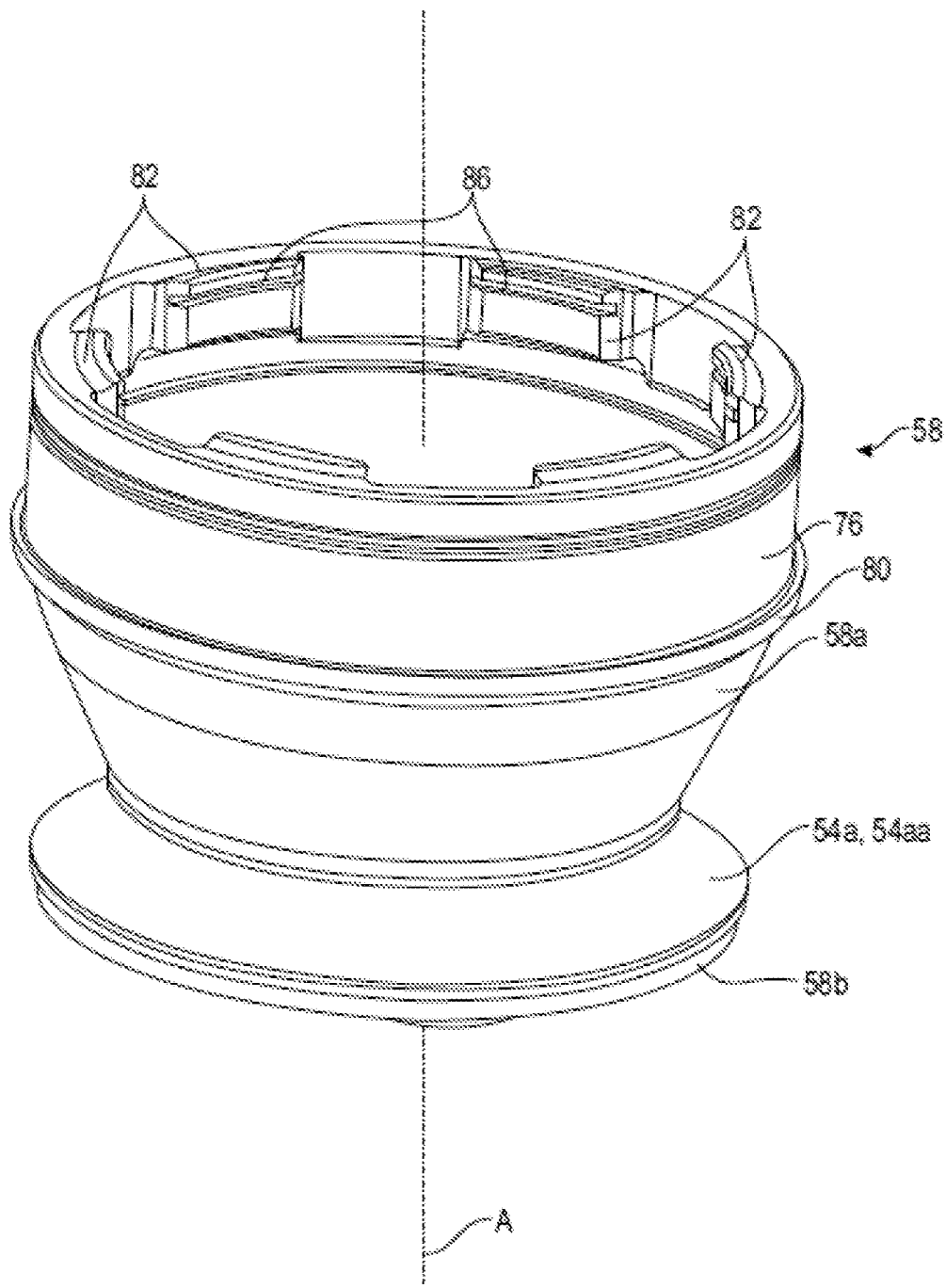
FIG. 9 is a schematic perspective view of a cup of the system in FIG. 8.

The teeth 82 of the cup 58 are best seen in FIG. 9. These teeth are evenly spaced around the axis A. There are six of them in the non-limiting example shown. For example, they each have an angular extension around the axis A of between approximately 20 and 30°.

Each of the teeth 82 comprises a groove 86 at its internal periphery which is circumferentially oriented with respect to the axis A. The grooves 86 of the teeth 82 form a discontinuous gorge around the axis A.

Figure 10:
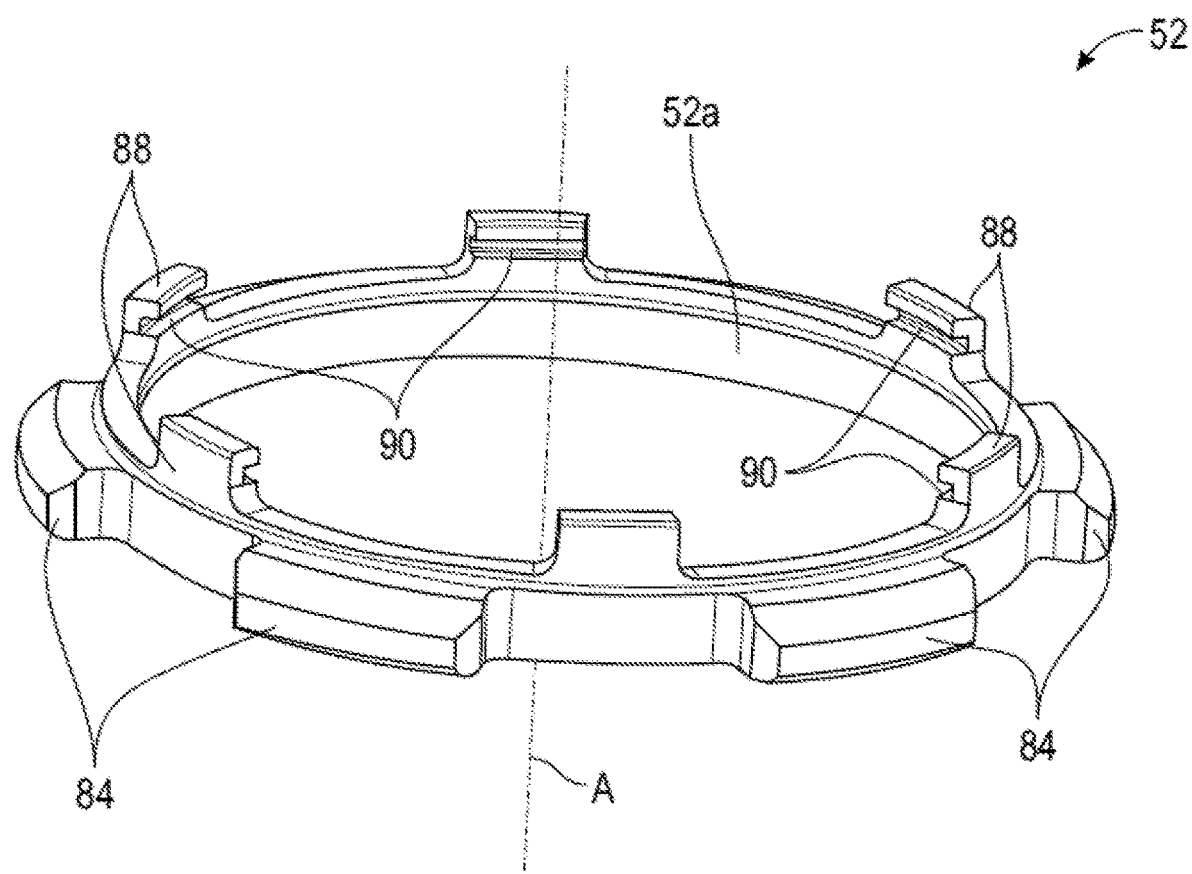
FIG. 10 is a schematic perspective view of a dog clutch ring of the system in FIG. 8.

The dog clutch ring is best seen in FIG. 10. Its teeth 84 are regularly spaced around the axis A. There are six teeth in the non-limiting example shown. For example, they each have an angular extension around the axis A of between approximately 20 and 30°.

The teeth 84 are complementary to the teeth 82 and are configured to cooperate by dog clutch with these teeth. The dog clutch is a well-known mode of mounting in the aeronautical field and will be illustrated by FIGS. 12 to 17 showing a mounting method.

The ring 52 comprises an internal cylindrical surface 52a intended to cooperate by sliding with the aforementioned surface 76 of the cup 58.

The ring 52 comprises a second set of teeth 88, which extend axially upwards on the side of the summit of the vane 10. These teeth 88 are also regularly spaced around the axis A. There are six of them in the example shown. They may be staggered in relation to the teeth 84, i.e. the teeth 88 are axially aligned with the circumferential spaces between the teeth 84. As a non-limiting example, the teeth 88 each have an angular extension around the axis A of between approximately 10 and 20°.

Each of the teeth 88 comprises at its internal periphery a groove 90 oriented circumferentially with respect to the axis A. The grooves 90 of the teeth 88 form a discontinuous gorge around the axis A.

Figure 11:
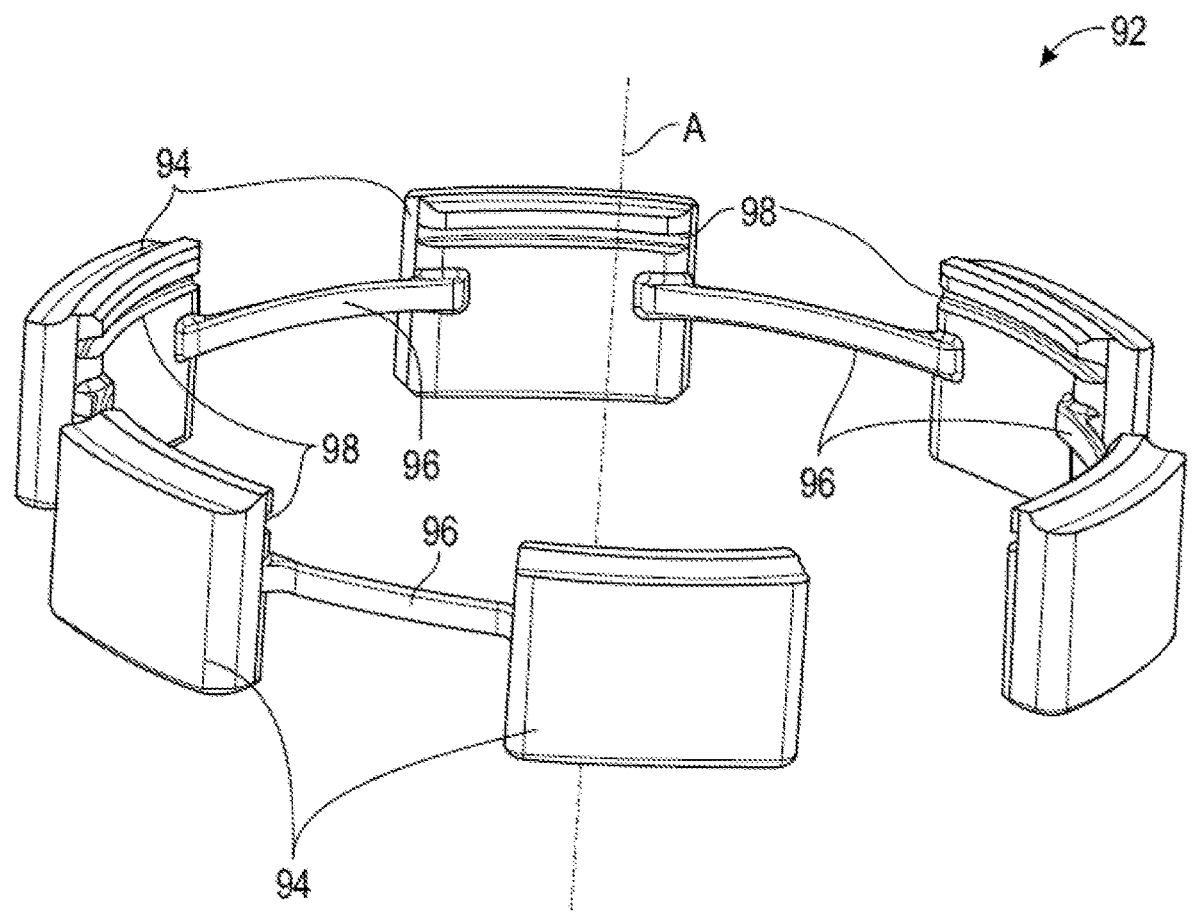
FIG. 11 is a schematic perspective view of a locking annulus of the system in FIG. 8.

FIG. 11 shows a locking annulus 92 which is configured to be axially engaged between the dog teeth 82, 84 to prevent the rotation of the ring 52 within the cup 58.

This annulus 92 comprises skids 94, here six in number in the non-limiting example shown, intended to be engaged in the inter-tooth spaces extending between the teeth 82 and 84. It is therefore understood that these skids 94 have complementary shapes to those of these spaces and are regularly spaced around the axis A.

In the example shown, the skids 94 are secured to each other by bridges 96 extending circumferentially between the skids 94. The bridges 96 are five in number and each extend between two adjacent skids 94. Two of the skids 94 are deliberately not connected together by a bridge so that the annulus 92 is open. This can simplify assembly by moving these skids away from or towards each other when mounting the annulus in the system 34.

Each of the skids 94 comprises a groove 98 at its internal periphery, oriented circumferentially with respect to the axis A. The grooves 98 in the skids 94 form a discontinuous gorge around the axis A.

Figure 17:
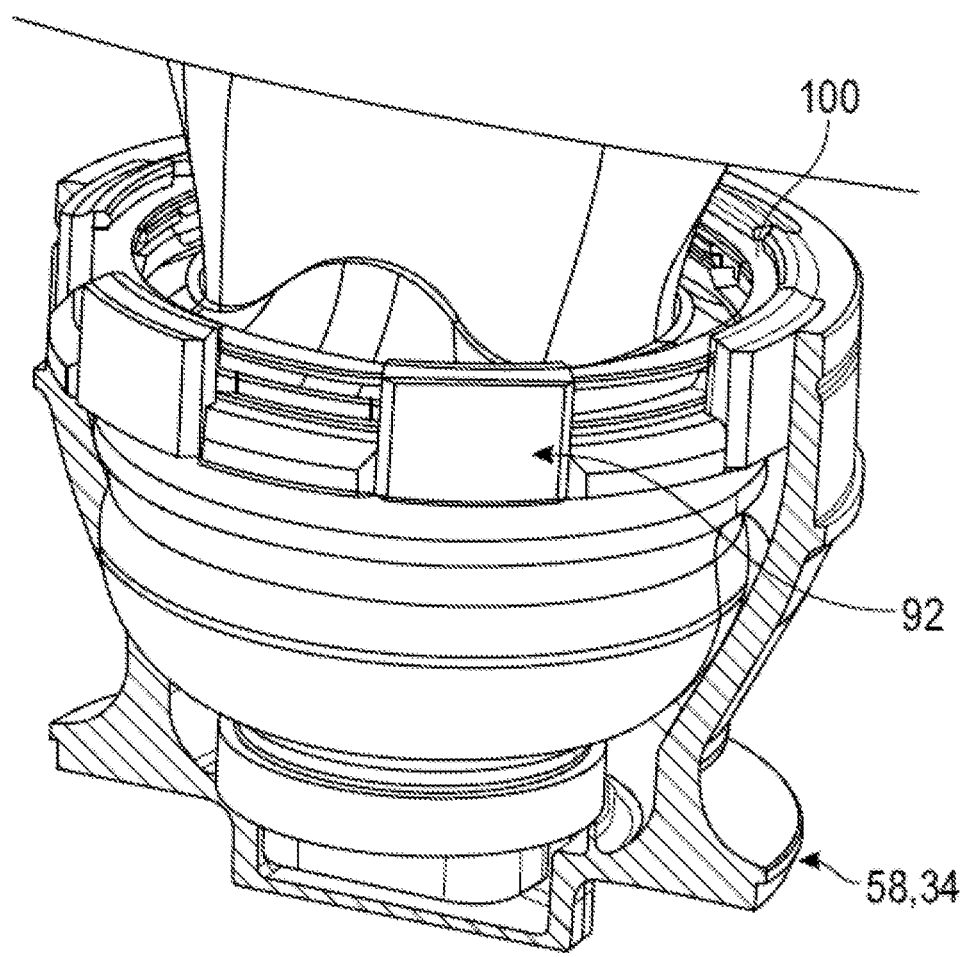
FIG. 17 is a schematic perspective and in partial axial sectional view of the root of the vane and of the system of FIG. 8, and shows a sixth mounting step.

The system further comprises an annular snap ring 100 which is only visible in FIG. 17.

The snap ring 100 is mounted in the cup 58 to axially block the locking annulus 92 in the cup 58. The snap ring 100 may also be split or open to facilitate its mounting and is intended to be engaged in the grooves 86 of the teeth 82 of the cup as well as the grooves 98 of the skids 94 of the annulus 92, when these grooves 86, 98 are all located in a same plane perpendicular to the axis A and are arranged circumferentially with respect to each other to form a complete gorge around the axis A (cf. FIGS. 16 and 17).

Reference is now made to FIGS. 12 to 17 which illustrate a method for mounting the assembly formed by a vane 10 as shown in FIG. 1 and a system 34 as shown in FIG. 8.

Figure 12:
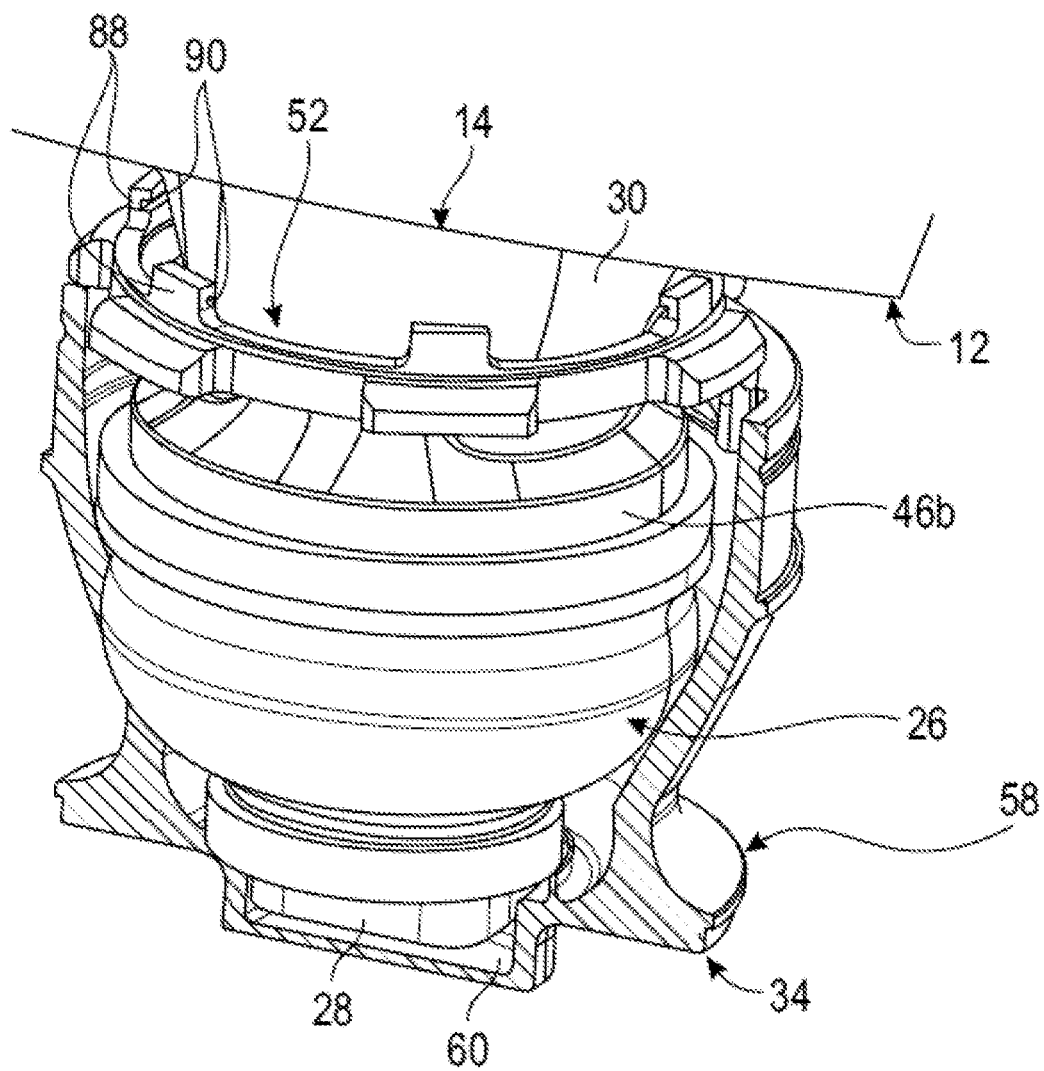
FIG. 12 is a schematic perspective and in partial axial sectional view of the root of the vane and of the system of FIG. 8, and shows a first mounting step.

In the first step shown in FIG. 12, the root 14 of the vane 10 is engaged in the cup 58 of the system 34 by axial translation along the axis A, until the end 28 of the body 24 of the root engages in the recess 60 of the cup 58. As can be seen in the drawing, the shrink-fitting ring is already mounted captive around the stilt 30 of the body of the root. Although not shown in this figure, the member 66 (FIG. 8) is compressed when the root 14 is inserted into the cup 58.

Figure 13:
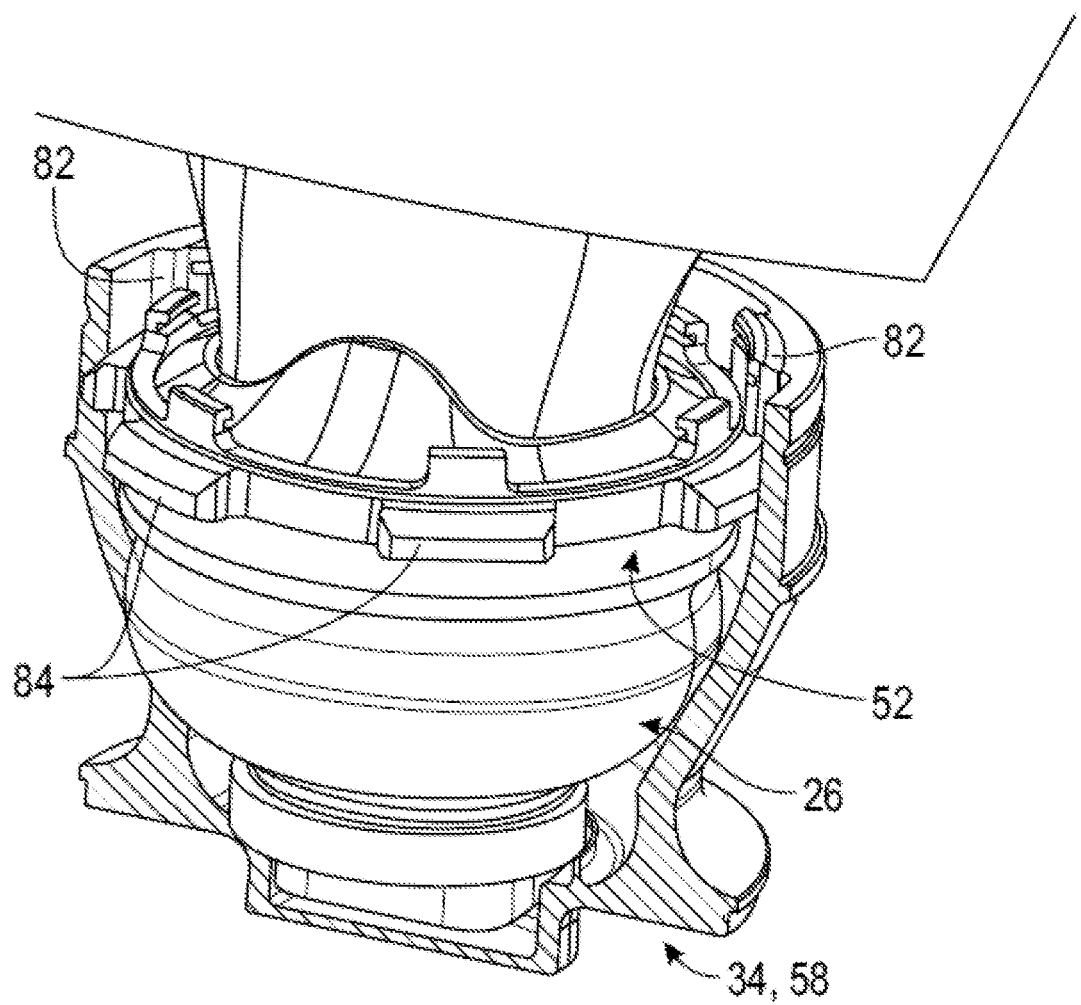
FIG. 13 is a schematic perspective and in partial axial sectional view of the root of the vane and of the system of FIG. 8, and shows a second mounting step.

In the second step illustrated in FIGS. 12 and 13, the shrink-fitting ring is angularly positioned about the axis A so that its teeth 84 are aligned with the spaces between the teeth 82 of the cup. The ring 52 is then displaced in axial translation within the cup 58 until the ring 52 is engaged on the surface 46b of the barrel 26 and the teeth 84 are located just below the teeth 82, as shown in FIG. 13. The grooves 90 provided on the teeth can be used to grip the ring 52 with a suitable tool.

Figure 14:
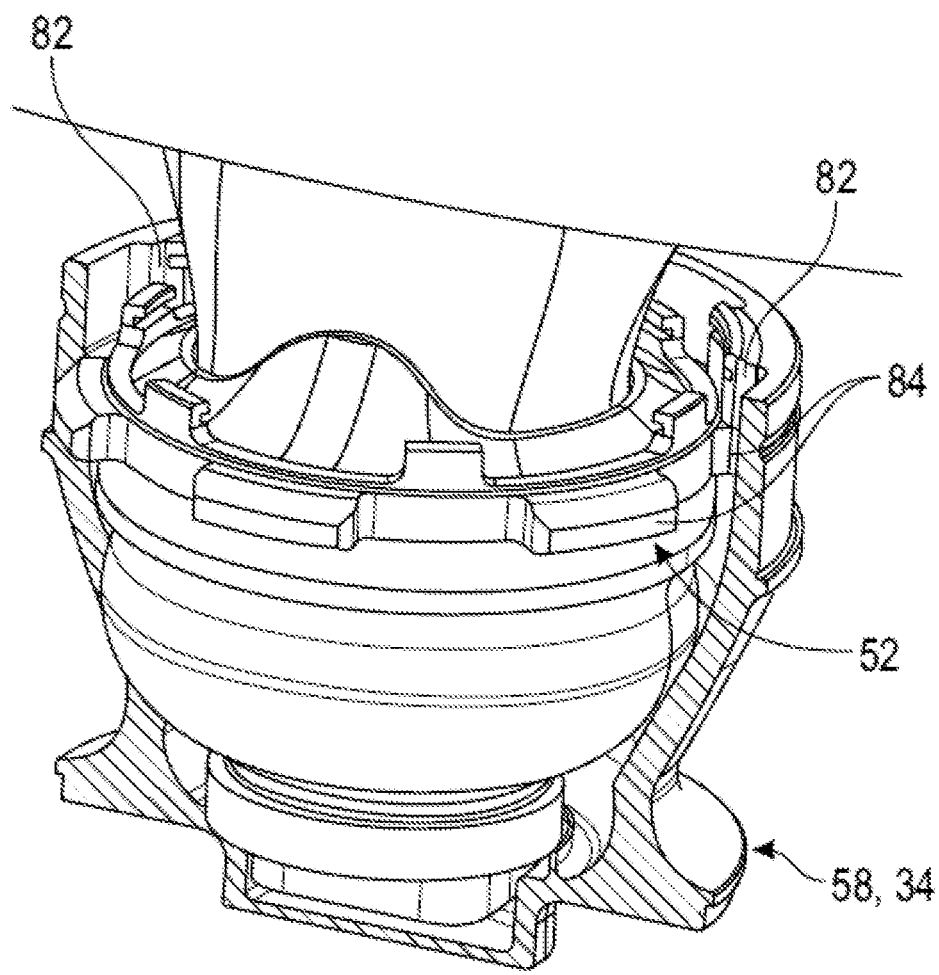
FIG. 14 is a schematic perspective and in partial axial sectional view of the root of the vane and of the system of FIG. 8, and shows a third mounting step.

In the third step illustrated in FIGS. 13 and 14, the ring 52 is displaced in rotation about the axis A so that these teeth 82, 84 are axially aligned with each other. Due to the angular extension of the teeth in the example shown, this angular displacement is in the order of 25-30°. The teeth 88 can be used to grip the ring 52 and rotate it by the aforementioned tool. The member 66, not shown, bias the root axially outwards from the cup, causing the teeth 84 to be supported axially on the teeth 82. The root is thus maintained axially inside the cup and the system 34. In operation, the centrifugal forces applied to the vane are transmitted by the teeth 82, 84 to the cup 58, these forces being directly taken up by the bearing 54 whose internal ring 54a is integrated into the cup 58.

Figure 15:
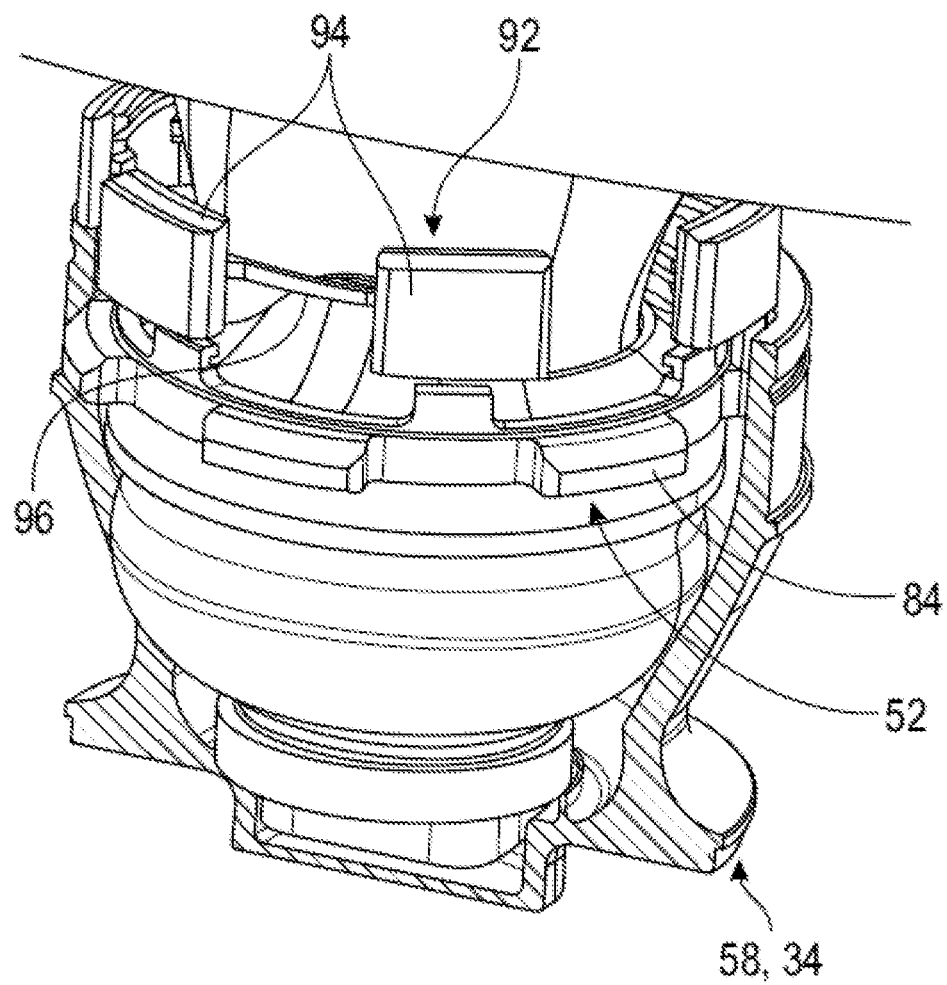
FIG. 15 is a schematic perspective and in partial axial sectional view of the root of the vane and of the system of FIG. 8, and shows a fourth mounting step.
Figure 16:
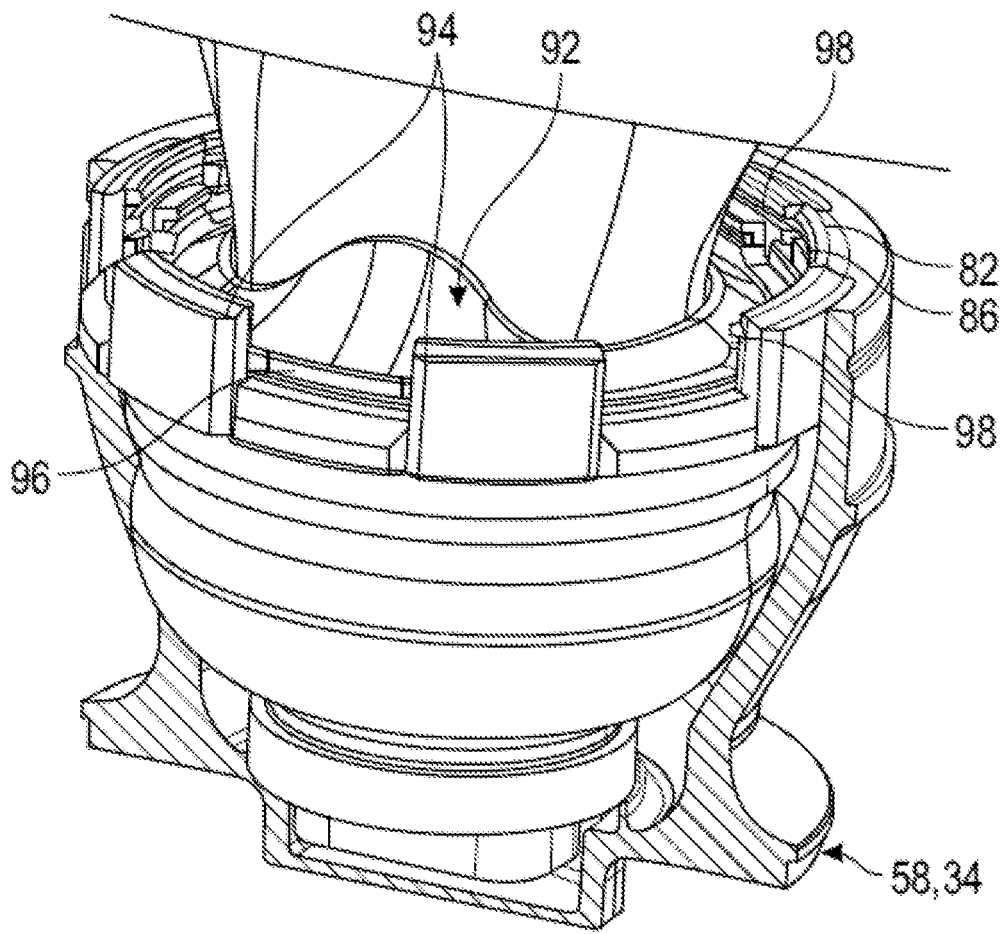
FIG. 16 is a schematic perspective and in partial axial sectional view of the root of the vane and of the system of FIG. 8, and shows a fifth mounting step.

In the fourth step illustrated in FIGS. 15 and 16, the annulus 92 is angularly positioned about the axis A so that its skids 94 are aligned with the spaces located between the teeth 82, 84. The annulus 92 is then displaced in axial translation within the cup 58 until the skids 94 are engaged in these spaces. The bridges 96 can then be supported on the teeth 84 of the ring 52. The annulus 92 thus prevents any rotation of the ring 52 inside the cup 58.

In the final step shown in FIG. 17, the snap ring 100 is engaged in the grooves 86, 98 circumferentially aligned with each other. The snap ring 100 prevents an accidental dismounting of the annulus 92.

It is understood that the dismounting of the vane is carried out by carrying out the aforementioned steps in reverse order. It is also understood that one of the essential steps in the mounting and dismounting of the root is the immobilisation ring 52. This ring 52 can be manipulated from the outside of a turbine engine, which is particularly advantageous during a maintenance operation. A vane can be dismounted and removed from the propeller by dismounting and removing a minimum number of parts.

Figure 18:
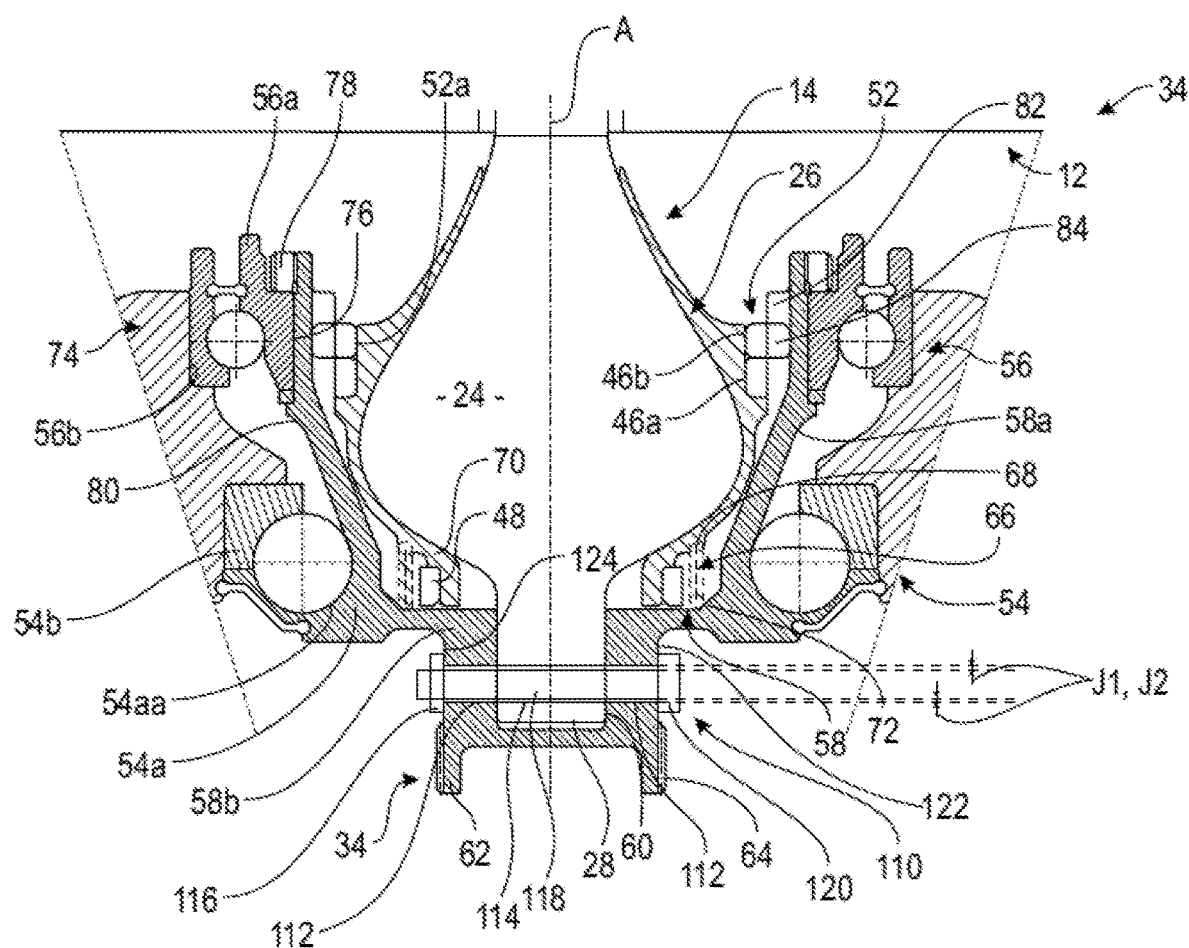
FIG. 18 is a schematic view in axial section of the root of the vane of FIG. 1 and of a first embodiment of a system according to the invention for controlling the pitch setting of this vane.
Figure 19:
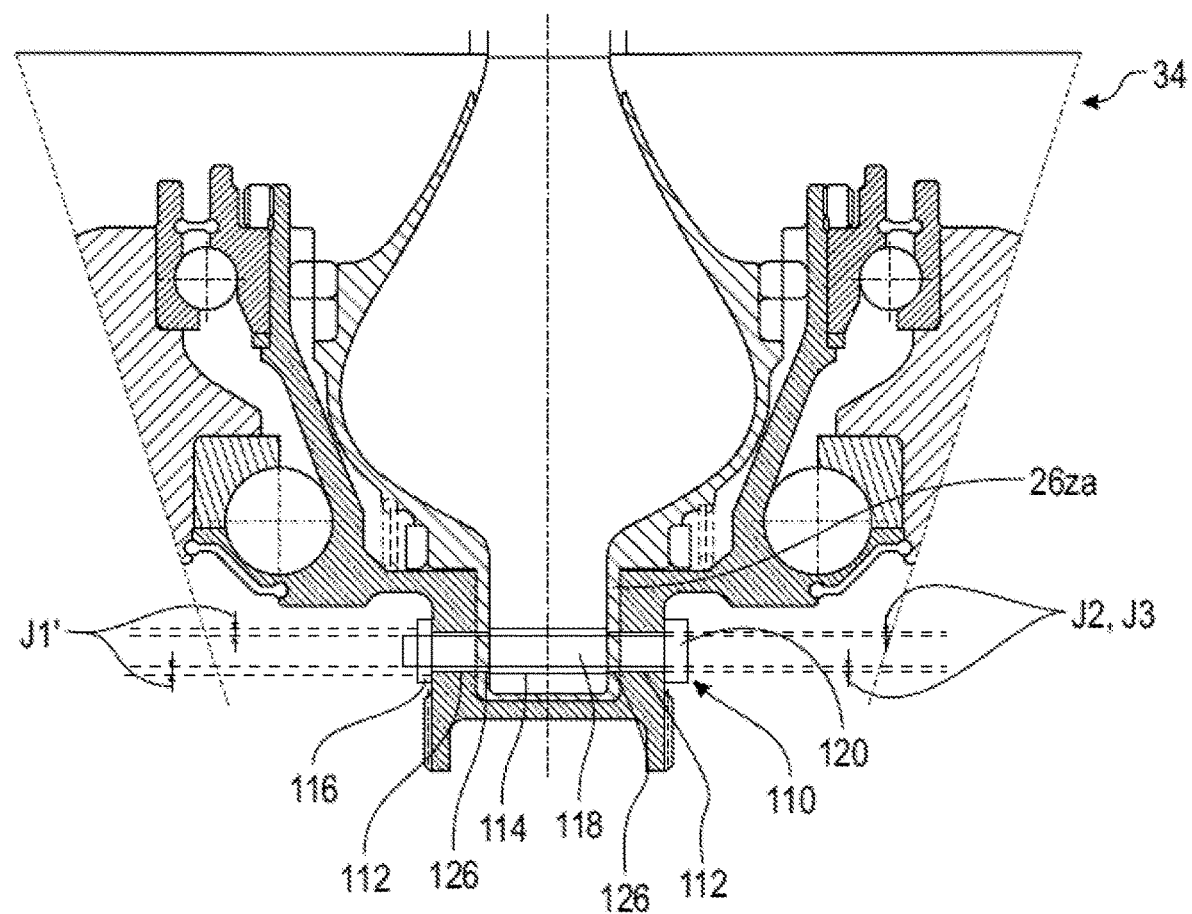
FIG. 19 is a schematic axial cross-sectional view of the root of the vane of FIG. 1 and a second embodiment of a system according to the invention for controlling the pitch setting of this vane.

Reference is now made to FIGS. 18 and 19 which illustrate two embodiments of a control system 34 according to the invention.

Each of these systems differs from the one described above in that it is equipped with a safety function referred to as "failsafe".

The above description in relation to FIGS. 1 to 17 therefore applies to the control systems of FIGS. 18 and 19.

In each of the systems shown in FIGS. 18 and 19, at least one safety element 110 ensure the retention of the root 14 from the cup 58. The failsafe safety can be ensured by a single such safety element 110 or by several adjacent and parallel safety elements (e.g. two or three). The safety element 110 allows to ensure that the vane 10 is not released in the event of failure of the immobilisation ring 52.

In the examples shown, the safety element 110 has a generally elongated shape and extends transversely with respect to the axis A. The safety element 110 passes through aligned orifices 112, 114 in the bottom wall 58b of the cup 58 as well as in the free end 28 of the root 14. This free end 28 is formed by a monobloc protuberance of the body 24 insofar as the barrel 26 is axially set back from this free end.

As in the examples shown, the safety element 110 may be a bolt comprising a screw and a nut 116.

The screw comprises a threaded rod 118 which passes through the orifices 112, 114 and a head 120 which is applied against a lateral face 122 of the bottom wall 58b. The nut 116 is screwed onto the threaded rod 118 and is supported on an opposite lateral face 124 of the bottom wall 58b. The faces 122, 124 are parallel to each other and to the axis A. The threaded rod 118 has, for example, a diameter of between 1.27 mm (½ inch) and 0.95 mm (⅜ inch).

The safety element 110 passes with a predetermined clearance J1 through the orifice 114 of the free end 28 of the root 14, on the one hand, and with another predetermined clearance J2 through the orifices 112 of the bottom wall 58b of the cup 58.

In the embodiment shown in FIG. 18, these clearances J1, J2 are substantially identical.

In the alternative embodiment shown in FIG. 19, the barrel 26 comprises an axial extension 26za which surrounds the protuberance of the free end 28 of the root 14 and which comprises orifices 126 aligned with the orifices 114 of the protuberance and the orifices 112 of the bottom wall 58b. The safety element 110 passes through the orifices 112, 114 and 126.

In the case of FIG. 18, the safety element 110 passes through the lower end of the vane and allows to carry out the retention of the vane 10 by introducing a secondary force path on the cup 58 and thus on the internal ring of the bearing 54 which is integrated into the cup.

In FIG. 19, the clearances J3 between the safety element 110 and the orifices 126 of the barrel 28 are smaller than the clearance J1' between the safety element 110 and the orifice 114 of the protuberance, and are preferably identical to the clearances J2 between the safety element 110 and the orifices 112 of the bottom wall 58b of the cup 58. This allows the safety element 110 to primarily cooperate with the barrel 28 rather than the protuberance of the root 14 when retaining the vane. The barrel 28 is made of a (metallic) material which is harder and more resistant to the support constraints than the (composite) material of the root. In the event of a problem, the retention of the root 14 of the vane will therefore be ensured by the cooperation of the barrel 26 with the safety element 110. The protuberance of the root 14 will then not be biased and therefore not at risk of damage in the event of failure of the immobilisation ring 52. The barrel 26 will be able to dissipate energy by plastic deformation and relieve the body of the composite root.

Figure 20:
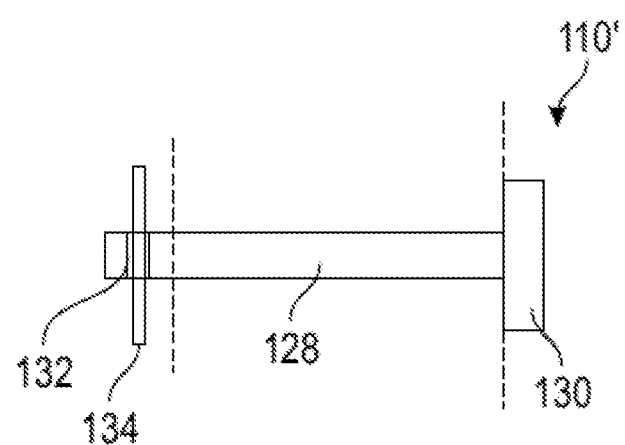
FIG. 20 is a very schematic view of a variant embodiment of a safety element.

In the variant embodiment shown in FIG. 20, the safety element 110' is a stud comprising a cylindrical body 128 intended to pass through the aforementioned orifices. The body 128 comprises a longitudinal end connected to a head 130 and an opposite longitudinal end comprising a transverse orifice 132 for receiving a lock 134 of the brake wire type or the like. For example, the body 128 has a diameter of between 1.27 mm (½ inch) and 0.95 mm (⅜ inch).

The invention also proposes a method for mounting the system 34, which comprises the following steps:

a) inserting the root 14 of the vane 10 into the cup 58 of the system 34, by displacing the vane 10 in a direction parallel to the pitch axis A, b) engaging the free end 28 of the root 14 in the recess 60 of the bottom wall 58b of the cup 58 so as to secure in rotation the cup 58 to the root 14 of the vane 10, c) engaging the immobilisation ring 52, previously mounted or present around the root 14 of the vane 10, in the cup 58 and mounting this ring 52 in the cup 58 and on the root 14 of the vane 10 so as to ensure the axial retention of the root 14 in the cup 58, and d) engaging the safety element or elements in the orifices in the bottom wall 58b of the cup 58 and the free end 28 of the root 14.

The introduction of the safety element has an impact on the mounting sequence of the vane 10 in its housing. Initially, the vane 10 was only mounted from the outside. The installation of the safety element 10 requires an additional access to the lower portion of the vane, inside the cavity formed by the casing 74. The cowlings of this cavity can take it into account to simplify this access.

Other variant embodiments not shown are possible, including:
- the half-shells 26a, 26b of the barrel 26 can be fitted to the body 24 by bolting, riveting, welding, etc.;
- the glue for connecting the barrel 26 to the body 24 may be an epoxy glue, but it may also be an elastomer or a thermoplastic glue. It is also possible to use a non-stick film to allow for a relative movement while limiting the wear by friction;
- still on the subject of the barrel/body interface, several technical solutions can also be combined together among those proposed (gluing, pre-stress by washers or springs, pre-stress by the geometry of the barrel); these solutions can be combined independently of the existence of a clearance between the two portions of the barrel;
- Although less advantageous, the radial position of the bearing that ensures the centrifugal retention of the vane can be reversed with the radial position of the bearing that take up the bending moments resulting from the aerodynamic and centrifugal forces.

The invention claimed is:

1. A system for controlling a pitch setting of a propeller vane for an aircraft turbine engine, the system comprising:
a vane including a blade connected to a root;
a cup including an annular wall extending around a pitch axis of the vane, the annular wall having a lower axial end closed by a bottom wall, and an upper axial end which is open and configured to allow mounting of the root of the vane inside the cup, the bottom wall including a recess having a non-circular cross-section and configured to receive a free end of a complementary shape of the root so that the cup is secured in rotation to the root about the pitch axis;

an immobilization ring extending around the pitch axis and mounted around the root, the immobilization ring being mounted within the cup and cooperating respectively with the root and the annular wall of the cup to ensure the axial retention of the root in the cup; and at least one safety element configured to ensure retention of the root from the cup, the at least one safety element having a generally elongated shape and extending transversely to the pitch axis, the at least one safety element passing through aligned orifices in the bottom wall of the cup as well as an orifice in the free end of the root.

2. The system of claim 1, wherein the at least one safety element is a bolt comprising a screw and a nut, the screw comprising a threaded rod which passes through the orifices and a head which is applied against a lateral face of the bottom wall, the nut being screwed onto the threaded rod and being supported on an opposite lateral face of the bottom wall.

3. The system of claim 1, wherein the at least one safety element is a stud comprising a cylindrical body passing through the orifices.

4. The system of claim 1, wherein the at least one safety element passes with a first predetermined clearance through the orifice of the free end of the root.

5. The system of claim 4, wherein the at least one safety element passes with a second predetermined clearance through the orifices of the bottom wall of the cup.

6. The system of claim 5, wherein the first and second predetermined clearances are identical.

7. The system of claim 1, wherein the root of the vane comprises a body housed in an annular barrel which extends around the pitch axis and which is housed at least partly inside said cup, said free end of the root being formed by a protuberance of said body and by an axial extension of said barrel which each comprise an orifice for the passage of said at least one safety element.

8. The system of claim 7, wherein first clearances between said at least one safety element and the orifices of the barrel are smaller than a second clearance between the at least one safety element and the orifice of the protuberance.

9. The system of claim 8, wherein the first clearances are identical to a third clearance between the at least one safety element and the orifices of the bottom wall of the cup.

10. An assembly, comprising: the system according to claim 1; and the root comprising a body housed in an annular barrel which extends around the pitch axis of the vane.

11. A turbine engine comprising the system according to claim 1.

12. A method for mounting the system according to claim 1, the method comprising:

a) inserting the root of the vane within the cup of the system by displacing the vane in a direction parallel to the pitch axis;

b) engaging the free end of the root in the recess of the bottom wall of the cup so as to secure in rotation the cup to the root of the vane;

c) engaging the immobilization ring, previously mounted or present around the root of the vane, in the cup and mounting the immobilization ring in the cup and on the root of the vane so as to ensure the axial retention of the root in the cup; and d) engaging the at least one safety element in the orifices of the bottom wall of the cup and the free end of the root.

* * * * *